United States Patent
Perlman

(10) Patent No.: US 11,150,363 B2
(45) Date of Patent: *Oct. 19, 2021

(54) APPARATUS AND METHOD FOR CAPTURING STILL IMAGES AND VIDEO USING DIFFRACTION CODED IMAGING TECHNIQUES

(71) Applicant: REARDEN, LLC, Mountain View, CA (US)

(72) Inventor: Stephen G. Perlman, Palo Alto, CA (US)

(73) Assignee: REARDEN, LLC, Mountain View, CA (US)

(*) Notice: Subject to any disclaimer, the term of this patent is extended or adjusted under 35 U.S.C. 154(b) by 24 days.

This patent is subject to a terminal disclaimer.

(21) Appl. No.: 16/660,564

(22) Filed: Oct. 22, 2019

(65) Prior Publication Data
US 2020/0049840 A1   Feb. 13, 2020

Related U.S. Application Data

(63) Continuation of application No. 13/798,004, filed on Mar. 12, 2013, now Pat. No. 10,488,535.

(51) Int. Cl.
*G01T 1/29* (2006.01)
*H04N 5/225* (2006.01)
(Continued)

(52) U.S. Cl.
CPC ............ *G01T 1/295* (2013.01); *G02B 5/1842* (2013.01); *H04N 5/232* (2013.01); *H04N 5/369* (2013.01); *H04N 5/378* (2013.01)

(58) Field of Classification Search
CPC ...... H04N 5/2254; H04N 5/378; H04N 5/232; H04N 5/23229; H04N 5/369; G01T 1/295; G02B 5/18–1895; G02B 2207/129
See application file for complete search history.

(56) References Cited

U.S. PATENT DOCUMENTS

| 4,209,780 A | 6/1980 | Fenimore |
| 4,360,797 A | 11/1982 | Fenimore et al. |

(Continued)

FOREIGN PATENT DOCUMENTS

| JP | H05333398 A | 12/1993 |
| JP | 2000503393 A | 3/2000 |

(Continued)

OTHER PUBLICATIONS

Non-Final Office Action from U.S. Appl. No. 13/798,004, dated Dec. 14, 2018, 12 pages.

(Continued)

*Primary Examiner* — Lin Ye
*Assistant Examiner* — Chriss S Yoder, III
(74) *Attorney, Agent, or Firm* — Nicholson De Vos Webster & Elliott LLP

(57) ABSTRACT

An apparatus and method are described for capturing images in visible light as well as other radiation wavelengths. In one embodiment, the apparatus comprises: a diffraction coded imaging system including a plurality of apertures arranged in a diffraction coded array pattern with opaque material blocking array elements not containing apertures; and a light- or radiation-sensitive sensor coupled to the diffraction coded imaging system array and positioned at a specified distance behind the diffraction coded imaging system array, the radiation-sensitive sensor configured to sense light or radiation transmitted and diffracted through the apertures in the diffraction coded imaging system array.

28 Claims, 11 Drawing Sheets

(51) Int. Cl.
  H04N 5/378   (2011.01)
  H04N 5/232   (2006.01)
  H04N 5/369   (2011.01)
  G02B 5/18    (2006.01)

(56) References Cited

U.S. PATENT DOCUMENTS

| | | | |
|---|---|---|---|
| 4,417,791 A | 11/1983 | Erland et al. | |
| 5,076,687 A | 12/1991 | Adelson | |
| 5,225,876 A | 7/1993 | Lux et al. | |
| 5,424,533 A | 6/1995 | Schmutz | |
| 5,479,026 A | 12/1995 | Schumtz et al. | |
| 5,699,798 A | 12/1997 | Hochman et al. | |
| 5,757,005 A | 5/1998 | Callas et al. | |
| 6,157,040 A | 12/2000 | Bauer | |
| 6,205,195 B1 | 3/2001 | Lanza | |
| 6,243,198 B1 | 6/2001 | Sedlmayr | |
| 6,271,900 B1 | 8/2001 | Li | |
| 6,324,296 B1 | 11/2001 | McSheery et al. | |
| 6,533,674 B1 | 3/2003 | Gobush | |
| 6,643,386 B1 | 11/2003 | Foster | |
| 6,737,652 B2 | 5/2004 | Lanza et al. | |
| 6,943,949 B2 | 9/2005 | Sedlmayr | |
| 7,009,652 B1 | 3/2006 | Tanida et al. | |
| 7,081,997 B2 | 7/2006 | Sedlmayr | |
| 7,152,984 B1 | 12/2006 | Hayes | |
| 7,154,671 B2 | 12/2006 | Sedlmayr | |
| 7,310,680 B1 | 12/2007 | Graham | |
| 7,633,944 B1 | 12/2009 | Chang et al. | |
| 7,671,321 B2 | 3/2010 | Perlman et al. | |
| 7,767,950 B2 | 8/2010 | Perlman et al. | |
| 7,792,423 B2 | 9/2010 | Raskar et al. | |
| 7,923,677 B2 * | 4/2011 | Slinger | G02B 27/4205 250/216 |
| 8,013,285 B2 | 9/2011 | Perlman et al. | |
| 8,243,353 B1 | 8/2012 | Gutin et al. | |
| 8,288,704 B2 | 10/2012 | Perlman et al. | |
| 2002/0114526 A1 | 8/2002 | Dennis | |
| 2003/0193599 A1 | 10/2003 | Campbell et al. | |
| 2005/0030625 A1 | 2/2005 | Cattin-Liebl | |
| 2005/0119868 A1 | 6/2005 | Scheidemann et al. | |
| 2005/0230597 A1 | 10/2005 | Hsieh et al. | |
| 2007/0024946 A1 | 2/2007 | Panasyuk et al. | |
| 2007/0273951 A1 | 11/2007 | Ribi | |
| 2009/0028451 A1 | 1/2009 | Slinger et al. | |
| 2009/0090868 A1 | 4/2009 | Payne et al. | |
| 2009/0316014 A1 | 12/2009 | Lim et al. | |
| 2011/0228895 A1 | 9/2011 | Ridley et al. | |
| 2011/0315855 A1 | 12/2011 | Perlman et al. | |
| 2013/0038766 A1 | 2/2013 | Perlman et al. | |

FOREIGN PATENT DOCUMENTS

| | | |
|---|---|---|
| WO | WO-03071569 A2 | 8/2003 |
| WO | 2005/022373 A2 | 3/2005 |
| WO | WO-2012127246 A1 | 9/2012 |

OTHER PUBLICATIONS

Busboom A., "Arrays and Rekonstruktions—algortihmen fur bildgebende System emit codierter Apertur," Relevant Chapters 1-5, 1999, pp. 128, Translation Included: Busboom, A., "Arrays and reconstruction algorithms for coded aperture imaging systems", vol. 10, No. 572, Translated Chapters, Ch.1-5, pp. 36.
Communication pursuant to Article 94(3) EPC for European Application No. 06718208.9, dated May 10, 2017, 4 pages.
Dicke R.H., "Scatter-Hole Cameras for X-Rays and Gamma Rays," Astrophysical Journal, 1968, vol. 153, pp. L101-L106.
Extended European Search Report from European Patent Application No. 06718208.9, dated Jan. 22, 2015, 6 pages.
Fenimore E.E., "Coded Aperture Imaging: Predicted Performance of Uniformly Redundant Arrays," Applied Optics, 1978, vol. 17 (22), pp. 3562-3570.
Fenimore E.E., "Large Symmetric π Transformations for Hadamard Transforms," Applied Optics, 1983, vol. 22(6), pp. 826-829.
Fenimore E.E., "Time-Resolved and Energy-Resolved Coded Aperture Images with URA Tagging," Applied Optics, 1987, vol. 26 (14), pp. 2760-2769.
Fenimore E.E., "X-Ray Imaging Using Uniformly Redundant Arrays," 1979, pp. 1-4.
Fenimore E.E., et al., "Coded Aperture Imaging with Uniformly Redundant Arrays," Applied Optics, 1978, vol. 17(3), pp. 337-347.
Fenimore E.E., et al., "Coded Aperture Imaging: The Modulation Transfer Function for Uniformly Redundant Arrays," Applied Optics, 1980, vol. 19(14), pp. 2465-2471.
Fenimore E.E., et al., "Comparison of Fresnel Zone Plates and Uniformly Redundant Arrays," SPIE, Applications of Digital Image Processing, 1978, vol. 149, pp. 232-236.
Fenimore E.E., et al., "Fast Delta Hadamard Transform," Applied Optics, 1981, vol. 20(17), pp. 3058-3067.
Fenimore E.E., et al., "Tomographical Imaging Using Uniformly Redundant Arrays," Applied Optics, 1979, vol. 18(7), pp. 1052-1057.
Fenimore E.E., et al., "Uniformly Redundant Array Imaging of Laser Driven Compressions: Preliminary Results," Applied Optics, 1979, vol. 18(7), pp. 945-947.
Fenimore E.E., et al., "Uniformly Redundant Arrays," Digital Signal Processing Symposium, 1977, pp. 1-14.
Fenimore E.E., et al., "Uniformly Redundant Arrays: Digital Reconstruction Methods," Applied Optics, 1981, vol. 20(10), pp. 1858-1864.
Final Office Action from U.S. Appl. No. 11/039,029, dated Dec. 15, 2006, 10 pages.
Final Office Action from U.S. Appl. No. 11/039,029, dated Mar. 3, 2009, 9 pages.
Final Office Action from U.S. Appl. No. 11/039,029, dated Nov. 6, 2007, 11 pages.
Final Office Action from U.S. Appl. No. 11/039,029, dated Nov. 6, 2008, 7 pages.
Final Office Action from U.S. Appl. No. 11/210,098, dated Aug. 21, 2008, 10 pages.
Final Office Action from U.S. Appl. No. 11/210,098, dated Jan. 13, 2009, 7 pages.
Final Office Action from U.S. Appl. No. 11/210,098, dated Jan. 29, 2007, 9 pages.
Final Office Action from U.S. Appl. No. 11/210,098, dated Mar. 31, 2008, 8 pages.
Final Office Action from U.S. Appl. No. 11/899,814, dated Jul. 29, 2008, 8 pages.
Final Office Action from U.S. Appl. No. 11/899,814, dated Mar. 3, 2009, 8 pages.
Final Office Action from U.S. Appl. No. 13/652,259 dated Aug. 4, 2016, 7 pages.
Final Office Action from U.S. Appl. No. 13/652,259 dated Oct. 28, 2014, 9 pages.
Final Office Action from U.S. Appl. No. 13/652,259 dated Sep. 23, 2015, 6 pages.
Final Office Action from U.S. Appl. No. 13/798,004, dated Feb. 2, 2016, 12 pages.
Final Office Action from U.S. Appl. No. 13/798,004, dated Jun. 1, 2018, 23 pages.
Final Office Action from U.S. Appl. No. 13/798,004, dated Jun. 26, 2017, 15 pages.
Final Office Action from U.S. Appl. No. 13/798,004, dated Oct. 22, 2014, 8 pages.
Gottesman S., et al., "New Family of Binary Arrays for Coded Aperture imaging," Applied Optics, 1989, vol. 28(20), pp. 4344-4392.
Gunson J., et al., "Optimum Design of A Coded Mask X-Ray Telescope for Rocket Applications," Monthly Notices of the Royal Astronomical Society, 1976, vol. 177, pp. 485-497.
Hendriks B., et al., "Through A Lens Sharply," IEEE Spectrum, Dec. 2004, pp. 32-36.
International Preliminary Report on Patentability and Written Opinion for Application No. PCT/US2014/025109, dated Oct. 1, 2015, 5 pages.

(56) References Cited

OTHER PUBLICATIONS

International Preliminary Report on Patentability for PCT Application No. PCT/US06/01111, dated Jul. 24, 2007, 8 pages.
International Search Report and Written opinion for Application No. PCT/US06/01111, dated Aug. 3, 2006, 13 pages.
International Search Report and Written opinion for Application No. PCT/US2014/025109, dated Jul. 14, 2014, 6 pages.
International Search Report from International Application No. PCT/US2000/019613, dated Nov. 14, 2000, 1 page.
Lytro User Manual, 2012, 25 pages, www.lytro.com.
Lytro, "What are the specs on the First Generation Lytro Light Field Camera?," Lytro Support, Jan. 27, 2016, 2 pages.
Ng R., et al., "Light Field Photography with a Hand-held Plenoptic Camera," Stanford Tech Report CTSR Feb. 2005, Apr. 2005, 11 pages.
Non-Final Office Action from U.S. Appl. No. 11/039,029, dated Apr. 12, 2007, 5 pages.
Non-Final Office Action from U.S. Appl. No. 11/039,029, dated Aug. 14, 2009, 13 pages.
Non-Final Office Action from U.S. Appl. No. 11/039,029, dated Jun. 27, 2006, 9 pages.
Non-Final Office Action from U.S. Appl. No. 11/039,029, dated Mar. 17, 2008, 9 pages.
Non-Final Office Action from U.S. Appl. No. 11/210,098, dated Jun. 22, 2006, 8 pages.
Non-Final Office Action from U.S. Appl. No. 11/210,098, dated Sep. 26, 2007, 8 pages.
Non-Final Office Action from U.S. Appl. No. 11/899,814, dated Aug. 17, 2009, 10 pages.
Non-Final Office Action from U.S. Appl. No. 11/899,814, dated Mar. 7, 2008, 13 pages.
Non-Final Office Action from U.S. Appl. No. 12/691,500, dated Aug. 23, 2010, 9 pages.
Non-Final Office Action from U.S. Appl. No. 13/226,461, dated Dec. 27, 2011, 10 pages.
Non-Final Office Action from U.S. Appl. No. 13/652,259 dated Apr. 10, 2014, 13 pages.
Non-Final Office Action from U.S. Appl. No. 13/652,259 dated Feb. 18, 2016, 8 pages.
Non-Final Office Action from U.S. Appl. No. 13/652,259 dated May 14, 2015, 9 pages.
Non-Final Office Action from U.S. Appl. No. 13/652,259, dated Mar. 31, 2017, 7 pages.
Non-Final Office Action from U.S. Appl. No. 13/798,004, dated Jan. 16, 2018, 148 pages.
Non-Final Office Action from U.S. Appl. No. 13/798,004, dated Jun. 17, 2015, 13 pages.
Non-Final Office Action from U.S. Appl. No. 13/798,004, dated Mar. 26, 2014, 12 pages.
Non-Final Office Action from U.S. Appl. No. 13/798,004, dated Sep. 23, 2016, 11 pages.
Notice of Allowance from U.S. Appl. No. 13/798,004, dated Aug. 15, 2019, 8 pages.
Notice of Allowance from U.S. Appl. No. 11/039,029, dated Mar. 24, 2010, 5 pages.
Notice of Allowance from U.S. Appl. No. 11/210,098, dated Oct. 21, 2009, 8 pages.
Notice of Allowance from U.S. Appl. No. 11/899,814, dated Mar. 23, 2010, 5 pages.
Notice of Allowance from U.S. Appl. No. 12/691,500, dated Apr. 29, 2011, 7 pages.
Notice of Allowance from U.S. Appl. No. 12/691,500, dated Dec. 27, 2010, 5 pages.
Notice of Allowance from U.S. Appl. No. 13/226,461, dated Jun. 12, 2012, 7 pages.
Notice to File a Response from foreign counterpart Korea Patent Application No. 10-2007-7028402, dated Jul. 31, 2012, 13 pages.
Notification of Reason for Rejection for counterpart Japan Patent Application No. 2007552179, dated Oct. 28, 2010, 2 pages.
NuCORE Technology, "CleanCapture NDX-1260 Analog Image Processor," 2004, 12 pages.
Paul Carlisle "Coded Aperture Imaging," 1998, pp. 1-6, printed on Mar. 15, 2007 Internet: http://paulcarlisle.net/old/codedaperature.html.
Renner E., "Pinhole Photography," 2000, pp. 1-5.
Restriction Requirement for U.S. Appl. No. 11/039,029 dated Apr. 12, 2006, 5 pages.
Teukolsky S.A., Numerical Recipes in C: The Art of Scientific Computing, Cambridge University Press, 1992, 949 pages.
Examination Report under Section 18(3) from foreign counterpart Great Britain Patent Application No. 1516416.3, dated Aug. 15, 2019, 3 pages.
Notice of Allowance from U.S. Appl. No. 13/652,259, dated May 10, 2018, 21 pages.
Non-Final Office Action, U.S. Appl. No. 16/207,941, dated Apr. 21, 2020, 9 pages.

* cited by examiner

APPARATUS AND METHOD FOR CAPTURING STILL IMAGES AND VIDEO USING DIFFRACTION CODED IMAGING TECHNIQUES

RELATED APPLICATIONS

This application is a continuation of the following co-pending U.S. patent application Ser. No. 13/798,004, filed Mar. 12, 2013, all of which is herein incorporated by reference.

BACKGROUND OF THE INVENTION

This application also incorporates by reference the following U.S. Patents, Patent Applications and Provisional Applications, all assigned to the assignee of this application: U.S. patent application Ser. No. 13/652,259 entitled, "Apparatus And Method For Capturing Still Images And Video Using Coded Lens Imaging Techniques"; now U.S. Issued U.S. Pat. No. 10,148,897, Issued on Dec. 12, 2018; U.S. patent application Ser. No. 13/226,461 entitled, "Apparatus And Method For Capturing Still Images And Video Using Coded Lens Imaging Techniques", now U.S. Pat. No. 8,228,704; U.S. patent application Ser. No. 12/691,500 entitled, "Apparatus And Method For Capturing Still Images And Video Using Coded Lens Imaging Techniques", now U.S. Pat. No. 8,013,285, filed Jan. 21, 2010; U.S. patent application Ser. No. 11/210,098 entitled "Apparatus And Method For Capturing Still Images And Video Using Coded Lens Imaging Technique" filed on Aug. 22, 2005, now U.S. Pat. No. 7,671,321; U.S. patent application Ser. No. 11/039,029, entitled, "Apparatus And Method For Capturing Still Images And Video Using Coded Aperture Techniques" filed on Jan. 18, 2005, now U.S. Pat. No. 7,767,949; and U.S. Provisional Application No. 60/701,435 entitled, "Apparatus And Method For Capturing Still Images And Video Using Coded Lens Imaging Techniques", filed on Jul. 20, 2005.

Field of the Invention

This invention relates generally to the field of image capture and image processing. More particularly, the invention relates to an apparatus and method for capturing still images and video using coded lens techniques.

DESCRIPTION OF THE RELATED ART

Photographic imaging is commonly done by focusing the light coming from a scene using a single glass lens which is placed in front of a light sensitive detector such as a photographic film or a semiconductor sensor including CCD and CMOS sensors.

For imaging high-energy radiation such as x-ray or gamma rays, other techniques must be used because such radiation cannot be diffracted using glass lenses. A number of techniques have been proposed including single pinhole cameras and multi-hole collimator systems. A particularly beneficial technique is "coded aperture imaging" wherein a structured aperture, consisting of a suitably-chosen pattern of transparent and opaque elements, is placed in front of a detector sensitive to the radiation to be imaged. When the aperture pattern is suitably chosen, the imaged scene can be digitally reconstructed from the detector signal. Coded aperture imaging has the advantage of combining high spatial resolution with high light efficiency. Coded aperture imaging of x-ray and gamma ray radiation using structured arrays of rectangular or hexagonal elements is known from R. H. DICKE: SCATTER-HOLE CAMERA FOR X-RAYS AND GAMMA RAYS. ASTROHYS. J., 153:L101-L106, 1968 (hereinafter "Dicke"), and has been extensively applied in astronomical imaging and nuclear medicine.

A particularly useful class of coded imaging systems is known from E. E. FENIMORE AND T. M. CANNON: CODED APERTURE IMAGING WITH UNIFORMLY REDUNDANT ARRAYS. APPL. OPT., 17:337-347, 1978 (hereinafter "Fenimore"). In this class of systems, a basic aperture pattern is cyclically repeated such that the aperture pattern is a 2×2 mosaic of the basic pattern. The detector has at least the same size as the basic aperture pattern. In such a system, the "fully coded FOV" ("FOV" shall be used herein to refer to "field-of-view") is defined as the area within the FOV, within which a point source would cast a complete shadow of a cyclically shifted version of the basic aperture pattern onto the aperture. Likewise, the "partially coded FOV" is defined as the area within the FOV, within which a point source would only cast a partial shadow of the basic aperture pattern onto the aperture. According to Dicke, a collimator is placed in front of the detector which limits the FOV to the fully coded FOV, thus allowing an unambiguous reconstruction of the scene from the detector signal.

From J. GUNSON AND B. POLYCHRONOPULOS: OPTIMUM DESIGN OF A CODED MASK X-RAY TELESCOPE FOR ROCKET APPLICATIONS. MON. NOT. R. ASTRON. SOC., 177:485-497, 1976 (hereinafter "Gunson") it is further known to give the opaque elements of the aperture a finite thickness such that the aperture itself acts as a collimator and limits the FOV to the fully coded FOV. Such a "self-collimating aperture" allows the omission of a separate collimator in front of the detector.

It should be noted that besides limiting the FOV, a collimator has the undesired property of only transmitting light without attenuation which is exactly parallel to the optical axis. Any off-axis light passing through the collimator is attenuated, the attenuation increasing towards the limits of the FOV. At the limits of the FOV, the attenuation is 100%, i.e., no light can pass through the collimator at such angles. This effect will be denoted as "collimator attenuation" within this document. Both in the x-direction and in the y-direction, collimator attenuation is proportional to the tangent of the angle between the light and the optical axis.

After reconstructing an image from a sensor signal in a coded aperture imaging system, the effect of collimator attenuation may have to be reversed in order to obtain a photometrically correct image. This involves multiplying each individual pixel value with the inverse of the factor by which light coming from the direction which the pixel pertains to, has been attenuated. It should be noted that close to the limits of the FOV, the attenuation, especially the collimator attenuation, is very high, i.e. this factor approaches zero. Inverting the collimator attenuation in this case involves amplifying the pixel values with a very large factor, approaching infinity at the limits of the FOV. Since any noise in the reconstruction will also be amplified by this factor, pixels close to the limits of the FOV may be very noisy or even unusable.

In a coded aperture system according to Fenimore or Gunson, the basic aperture pattern can be characterized by means of an "aperture array" of zeros and ones wherein a one stands for a transparent and a zero stands for an opaque aperture element. Further, the scene within the FOV can be characterized as a two-dimensional array wherein each array element contains the light intensity emitted from a single pixel within the FOV. When the scene is at infinite distance from the aperture, it is known that the sensor signal can be characterized as the two-dimensional, periodic cross-correlation function between the FOV array and the aperture array. It should be noted that the sensor signal as such has no resemblance with the scene being imaged. However, a "reconstruction filter" can be designed by computing the two-dimensional periodic inverse filter pertaining to the aperture array. The two-dimensional periodic inverse filter is a two-dimensional array which is constructed in such a way that all sidelobes of the two-dimensional, periodic cross-correlation function of the aperture array and the inverse filter are zero. By computing the two-dimensional, periodic cross-correlation function of the sensor signal and the reconstruction filter, an image of the original scene can be reconstructed from the sensor signal.

It is known from Fenimore to use a so-called "Uniformly Redundant Arrays" (URAs) as aperture arrays. URAs have a two-dimensional, periodic cross-correlation function whose sidelobe values are all identical. URAs have an inverse filter which has the same structure as the URA itself, except for a constant offset and constant scaling factor. Such reconstruction filters are optimal in the sense that any noise in the sensor signal will be subject to the lowest possible amplification during the reconstruction filtering. However, URAs can be algebraically constructed only for very few sizes.

It is further known from S. R. GOTTESMAN AND E. E. FENIMORE: NEW FAMILY OF BINARY ARRAYS FOR CODED APERTURE IMAGING. APPL. OPT., 28:4344-4352, 1989 (hereinafter "Gottesman") to use a modified class of aperture arrays called "Modified Uniformly Redundant Arrays" (MURAs) which exist for all sizes p×p where p is an odd prime number. Hence, MURAs exist for many more sizes than URAs. Their correlation properties and noise amplification properties are near-optimal and almost as good as the properties of URAs. MURAs have the additional advantage that, with the exception of a single row and a single column, they can be represented as the product of two one-dimensional sequences, one being a function only of the column index and the other being a function only of the row index to the array. Likewise, with the exception of a single row and a single column, their inverse filter can also be represented as the product of two one-dimensional sequences. This property permits to replace the two-dimensional in-verse filtering by a sequence of two one-dimensional filtering operations, making the reconstruction process much more efficient to compute.

It is further known from A. BUSBOOM: ARRAYS UND REKONSTRUKTIONSALGORITHMEN FUER BILDGEBENDE SYSTEME MIT CODIERTER APERTUR. VDI VERLAG, DUESSELDORF, 1999, ISBN 3-18-357210-9 (hereinafter "Busboom") to use so-called "Perfect Binary Arrays" (PBAs) which exist for all sizes $3^s\ 2^r \times 3^s\ 2^r$ and all sizes $3^s\ 2^{r-1} \times 3^s\ 2^{r+1}$ where s=0, 1, 2 . . . and r=1, 2, 3 . . . . Hence, PBAs also exist for many sizes, especially for many square sizes with an even number of columns and rows. Their correlation properties and noise amplification properties are as good as those of URAs.

If the scene is at a finite distance from the aperture, a geometric magnification of the sensor image occurs. It should be noted that a point source in the scene would cast a shadow of the aperture pattern onto the sensor which is magnified by a factor of f=(o+a)/o compared to the actual aperture size where o is the distance between the scene and the aperture and a is the distance between the aperture and the sensor. Therefore, if the scene is at a finite distance, the sensor image needs to be filtered with an accordingly magnified version of the reconstruction filter.

If the scene is very close to the aperture, so-called near-field effects occur. The "near field" is defined as those ranges which are less than 10 times the sensor size, aperture size or distance between aperture and sensor, whichever of these quantities is the largest. If an object is in the near field, the sensor image can no longer be described as the two-dimensional cross-correlation between the scene and the aperture array. This causes artifacts when attempting to reconstructing the scene using inverse filtering. In Lanza, et al., U.S. Pat. No. 6,737,652, methods for reducing such near-field artifacts are disclosed. These methods involve imaging the scene using two separate coded apertures where the second aperture array is the inverse of the first aperture array (i.e. transparent elements are replaced by opaque elements and vice versa). The reconstruction is then computed from two sensor signals acquired with the two different apertures in such a manner that near-field artifacts are reduced in the process of combining the two sensor images.

Coded aperture imaging to date has been limited to industrial, medical, and scientific applications, primarily with x-ray or gamma-ray radiation, and systems that have been developed to date are each designed to work within a specific, constrained environment. For one, existing coded aperture imaging systems are each designed with a specific view depth (e.g. effectively at infinity for astronomy, or a specific distance range for nuclear or x-ray imaging). Secondly, to date, coded aperture imaging has been used with either controlled radiation sources (e.g. in nuclear, x-ray, or industrial imaging), or astronomical radiation sources that are relatively stable and effectively at infinity. As a result, existing coded aperture systems have had the benefit of operating within constrained environments, quite unlike, for example, a typical photographic camera using a lens. A typical photographic camera using a single lens (i.e. a single lens per sensor or film frame; stereoscopic cameras have 2 lenses, but utilize a separate sensor or film frame per lens) is designed to simultaneously handle imaging of scenes containing 3-dimensional objects with varying distances from close distances to effective infinite distance; and is designed to image objects reflecting, diffusing, absorbing, refracting, or retro-reflecting multiple ambient radiation sources of unknown origin, angle, and vastly varying intensities. Other than the systems described in the patent applications listed in [0001] and incorporated by reference herein, no coded aperture system has ever been designed that can handle these types of unconstrained imaging environments that billions of photographic cameras with single lenses handle every day.

Photographic imaging in the optical spectrum using a single lens has a number of disadvantages and limitations. The main limitation of single lens photography is its finite depth-of-field (DOF), particularly at large aperture settings. Only scenes at a limited DOF can be in focus in a single lens image while any objects closer or farther away from the camera than the DOF will appear blurred in the image.

Further, a single lens camera must be manually or automatically focused before an image can be taken. This is a disadvantage when imaging objects which are moving fast or unexpectedly such as in sports photography or photography of children or animals, particularly at large apertures with a short DOF. In such situations, the images may be out of focus because there was not enough time to focus or because the object moved unexpectedly when acquiring the image. Single lens photography does not allow a photographer to retrospectively change the focus once an image has been acquired.

Still further, focusing a single lens camera involves adjusting the distance between one or more lenses and the sensor. This makes it necessary for a single lens camera to contain mechanically moving parts which makes it prone to mechanical failure. Various alternatives to glass lenses, such as liquid lenses (see, e.g., B. HENDRIKS & STEIN KUIPER: THROUGH A LENS SHARPLY. IEEE SPECTRUM, DECEMBER, 2004), have been proposed in an effort to mitigate the mechanical limitations of a glass lens, but despite the added design complexity and potential limitations (e.g., operating temperature range and aperture size) of such alternatives, they still suffer from the limitation of a limited focus range.

Still further, single lens cameras have a limited dynamic range as a result of their sensors (film or semiconductor sensors) having a limited dynamic range. This is a severe limitation when imaging scenes which contain both very bright areas and very dark areas. Typically, either the bright areas will appear overexposed while the dark areas have sufficient contrast, or the dark areas will appear underexposed while the bright areas have sufficient contrast. To address this issue, specialized semiconductor image sensors (e.g. the D1000 by Pixim, Inc. of Mountain View, Calif.) have been developed that allow each pixel of an image sensor to sampled each with a unique gain so as to accommodate different brightness regions in the image. But such image sensors are much more expensive than conventional CCD or CMOS image sensors, and as such are not cost-competitive for many applications, including mass-market general photography. Another approach to achieve higher dynamic range is for digital cameras to be configured to take successive images at varying gain, and then to post-process the image sequence to assemble a single image from parts of each successive image that are within the dynamic range of the sensor. A disadvantage with this approach is, if the scene or camera is in rapid motion, the successive images will be different and may not combine well to a uniform single image.

Because of the requirement to focus, single lenses can provide a rough estimate of the distance between the lens and a subject object. But since most photographic applications require lenses designed to have as long a range of concurrent focus as possible, using focus for a distance estimate is extremely imprecise. Since a single lens can only be focused to a single distance range at a time, at best, a lens will provide an estimate of the distance to a single object range at a given time.

Visible light photographic Coded Aperture Imaging (CAI) (as disclosed in U.S. Pat. No. 7,767,949 filed Jan. 18, 2005 entitled "Apparatus And Method For Capturing Still Images And Video Using Coded Aperture Techniques,"; hereinafter the "CAI Application" and the technology described as "CAI") addresses many of the limitations of a single lens camera. Relative to a single lens camera, CAI makes it possible to make a thinner camera, a lighter camera, a camera with greater dynamic range (even during fast motion), and also a camera which can reconstruct an image which is in focus throughout a large range of depth in the scene.

A visible light coded aperture camera according to one embodiment described in the CAI Application is illustrated in FIG. 1. The illustrated embodiment includes a coded aperture 101 placed in front of a light sensitive grayscale or color semiconductor sensor 104. The coded aperture 1012 is a pattern of circular, square, hexagonal, rectangular or other tiled elements, some of which are transparent to visible light (e.g. element 102) and some of which are opaque (e.g. element 103). Note that for illustration clarity purposes, coded aperture 101 has very few transparent elements. A typical coded aperture may have significantly more transparent elements (e.g., 50%). Visible light a from 2-dimensional or 3-dimensional scene 100 (which may be illuminated by ambient or artificial lighting) is projected through the coded aperture 101 onto image sensor 104. The camera is capable of limiting the FOV to the fully coded FOV projected onto the sensor. In one embodiment, this is implemented by the use of a self-collimating coded aperture 101 (utilizing baffles for collimation, as explained below). The space between the coded aperture and the sensor is shielded by a light-opaque housing 105 (only the outline of which is shown in FIG. 1), preventing any light from reaching the sensor other than by passing through an open element of the coded aperture.

The camera further includes an image sensor readout subsystem 110 with an interface 109 to the image sensor 104 (which may be similar to those used in prior coded aperture systems). The readout subsystem clocks out the analog image signal from the image sensor 104 and applies analog buffering, amplification and/or filtering as required by the particular image sensor. An example of such a readout subsystem 110 that also incorporates A/D 120 is the NDX-1260 CleanCapture Image Processor by NuCore Technology, Inc. of Sunnyvale, Calif. The ability to adjust the zero offset 112 and gain 111 to analog pixel values read by the readout subsystem 110 (e.g., using at least one operational amplifier (op amp)) will increase the dynamic range of the captured image, but is not essential if the image sensor has a sufficient dynamic range for the desired image quality without a zero-offset and gain adjustment.

In one embodiment, the output of the readout subsystem 110 is coupled by interface 113 to at least one analog-to-digital converter (A/D) 120 which digitizes the analog output. The output of the A/D is coupled via interface 121 to an image reconstruction processor 130, which in one embodiment incorporates a Digital Signal Processor (DSP) 132 and Random Access Memory (RAM) 131. The digitized image from the interface 121 is stored in RAM 131, and the DSP 132 post-processes the image so as to reconstruct the original scene 101 into a grayscale or color image. In accordance with another embodiment, the image reconstruction processor 130 incorporates a general purpose CPU such as an Intel Corporation Pentium 4®, or similar general purpose processor. In yet another embodiment, the image reconstruction processor 130 incorporates an Application-Specific Integrated Circuit ("ASIC") which implements part or all of the reconstruction processing in dedicated digital structures. This grayscale or color image reconstructed by reconstruction processor 130 is output through interface 133 to be displayed on a display device 140.

However, one limitation of CAI is the resolution of the reconstructed image. The resolution of a CAI camera is limited by the larger of two primary factors: (a) the order of the aperture array, and (b) distortion in the projected image caused by diffraction. This is explained further in the following paragraphs.

FIG. 4 shows several representative coded aperture array patterns of MURAs of "order" 101, 61 and 31 (described in more detail in the CAI application). FIG. 4 also shows coded aperture array patterns of PBAs of order 8 and 24. (The PBAs 8 and 24 are shown enlarged relative to the MURAs to better show their patterns.). Note that the coded aperture array patterns are formed from a square array (with horizontal and vertical dimensions of the specified order) that is repeated twice in the horizontal and twice in the vertical dimension. So, for example, the MURA 101 pattern has a total size of 202×202. Note also that each of the aperture elements in the arrays is of the same size. Although it appears that some of the apertures are larger than others, this is simply because adjacent apertures combine to create what appears to be a larger aperture. A CAI camera cannot resolve an image that is higher resolution than the order of its coded aperture array. For example, a MURA 101 CAI camera cannot resolve an image of higher resolution than 101×101 pixels.

For purposes of illustration, FIG. 5 shows one embodiment of the visible light coded aperture camera shown in FIG. 1. The embodiment shown in FIG. 5 is not useful for many applications because the resolution of the reconstructed image is only 3×3 pixels, but it is illustrative of how a camera such as that shown in FIG. 1 works. A MURA order 3 ("MURA 3") aperture array 301 contains 16 open apertures, such as open aperture 302, and 20 closed apertures, such as closed aperture 303. Color or grayscale sensor 304 is the same size as one quadrant (i.e. one 3×3 block of apertures) of the MURA 3 aperture array 301 and in this embodiment it is positioned centered relative to the MURA 3 aperture array 301.

Orthographic View 320 of FIG. 5 reveals more of the structure of the camera. Baffles (referred to as "collimators" in the CAI Application) 317 serve to collimate the light passing through open apertures, such as open aperture 302. This restricts the FOV of each aperture projection onto color or grayscale sensor 304. Closed apertures such as closed aperture 303 are covered with an opaque cover so they do not allow light to pass through. Sensor 304 is separated from MURA 3 aperture array 301 and baffles 317 to allow space for the overlapping projections from each of the open apertures. The entire unit is contained within a light-tight camera body 316, which is shown to be transparent for the purposes of illustration. Note that in this particular example, even if sensor 304 is a very high-resolution sensor, only a 3×3 pixel image can be reconstructed.

FIG. 7 shows a side view diagram of the camera in FIG. 5 that illustrates the upper and lower extent of the projection of the light passing through leftmost column of apertures of the MURA 3 of aperture illustration 300 and reaching light sensor 304 (light sensor 804 in FIG. 7). Diagrams 800*a* and 800*b* of FIG. 7 differ only in that the 800*a* shows the projection range 805 of light for a single aperture (for clarity) in dashed lines, whereas 800*b* shows the projection range of light for all of the open apertures. Light from the scene is projected through the open apertures, including open aperture 802, and is blocked from passing through closed apertures, including closed aperture 803. The FOV of the projection is restricted by baffles, such as 801. The projection through the open apertures projects across the focal length of the camera and some or all of the light from each open aperture projects onto the sensor 804. The projection 805, as an example, mostly projects onto the sensor, but partially projects over the top of the sensor, and as such, the sensor only detects the part of the projection that is projected onto the sensor. As can be seen in 800*b*, the projections from multiple open apertures overlap each other.

FIG. 6 illustrates how light is projected through the MURA 3 aperture array. Illustration 400 shows the MURA 3 aperture array 401 delineated by a solid black outline, with exemplary open aperture 402 and closed aperture 403. The position of color or grayscale sensor 404 is delineated by a dotted outline. Open aperture 405 is delineated by a dashed line. The light that passes through aperture 405 projects onto a square area on the sensor plane shown as a gray square 406. Note that because aperture array 401 is shown overlaying the projection in illustration 400, much of projection 406 is obstructed by closed apertures. Nonetheless, the perimeter of projection 406 can be seen delineated by a solid gray outline.

In this embodiment, projection 406 is a square approximately 9 times larger than aperture 405 and centered on aperture 405. Depending on how close or far sensor 404 is to the aperture array, this projection may correspond to a wider or narrower FOV. Baffles around aperture 405 (not shown in this illustration, but visible as baffles 317 in FIG. 5) are used in this embodiment to limit the extent of projection 406 to approximately 9 times larger than the size of aperture 405.

Note that in this embodiment only a small percentage of the area of projection 406 overlaps sensor 404. Part of this overlap is visible through an open aperture 409 and part of it is obscured by closed aperture 408.

Illustration 410 shows the overlaying of the 4 projections from the upper right quadrant of aperture array 401. (For clarity, in illustrations 410 and 420, only the outline of MURA 3 aperture array 401 is shown.) The 4 open apertures 415 in the upper right quadrant are delineated with dashed outlines. The 4 projections 416 from these 4 apertures are shown as overlapping gray areas. Each projection, like projection 406 shown in illustration 400, is a square approximately 9 times the size of its aperture and is centered on its aperture, and is delineated by a solid gray line. To indicate the number of overlapping projections in each area of the sensor plane, varying levels of gray scale are used to fill each area. The lightest gray indicates 1 projection, the next darker indicates 2 projections overlapping, the next darker indicates 3 projections overlapping, and finally the darkest indicates 4 projections overlapping.

Illustration 420 shows the overlaying of all 16 projections from the entire aperture array 401. The 16 open apertures 425 are delineated by dashed outlines. Each projection, like the projection 406 shown in illustration 400, is a square approximately 9 times the size of its aperture and centered on its aperture, and is delineated by a solid gray line. To indicate the number of overlapping projections in each area of the sensor plane, varying levels of gray scale are used as described in the previous paragraph. Note that in this embodiment each area of sensor 404 is shown covered by 4 overlapping projections. In practice, it is correct that there will be 4 overlapping projections over the vast majority of the sensor area, but because of tolerance variations, diffraction effects, and varying distances to objects in the observed scene, there may be fewer or more overlapping projections near the borders of projections, which are shown as solid gray lines in illustration 420.

Note also that most of the light hitting the MURA 3 aperture array 401 is projected beyond the edges of sensor 404, and as a result this light is not used for the reconstruction. If the area of the rightmost column of the MURA 3 aperture array 401 is disregarded (since all apertures in that column are closed, it does not contribute any light to the camera and can be removed from the system without impacting the image reconstruction), approximately 13% of the light hitting the remaining area of the MURA 3 aperture array 401 is actually projected onto the sensor 404. A conventional single f/2.8 lens transmits approximately 12.7% of the light hitting the lens, so the 13% light transmission performance of this MURA 3 coded aperture array camera can be seen as comparable to a conventional f/2.8 lens.

Generally speaking, f/2.8 is good light transmission performance for a photographic lens, so the description of the MURA 3 coded aperture camera in the last few paragraphs characterizes a camera with potentially desirable light transmission characteristics. Unfortunately, only a 3×3 pixel image can be reconstructed by the system described.

Each element in a CAI camera acts geometrically like a pinhole in a pinhole camera. Light passing through each aperture makes a projection onto the sensor, just as it would in a pinhole camera. And like a pinhole camera, a CAI camera is subject to the diffraction effects of light passing through a pinhole. In a pinhole, these diffraction effects create a point source projected pattern commonly known as the "Airy disk". The primary lobe of the Airy disk roughly defines the smallest resolvable spot size from a given pinhole camera projection. At a given distance from the pinhole to the sensor, the Airy disk increases in size as the pinhole decreases in size. From a geometric point of view, the resolution (i.e. minimum point source projection spot size) of images from a pinhole camera also increases as the pinhole gets smaller. So, for any given distance of pinhole to sensor, there is an optimum pinhole size where the point source projection spot size equals the size of the primary lobe of the Airy disk. If the pinhole is made smaller than this optimum size, resolution decreases because the Airy disk increases in size. If the pinhole is made larger than this optimum size, resolution decreases because a point source projection spot size increases. Since the characterization of resolution of a pinhole camera is subjective, different formulae have been proposed for calculating the optimal pinhole diameter. One such formula is A=SQRT(55F), where A is the pinhole diameter in thousandths of an inch, F is the camera focal length in inches, and SQRT( ) is the square root function.

Note that achievable resolution in a pinhole camera increases as the focal length of the camera increases. Unfortunately, the physical size of the camera typically increases in proportion to the focal length, and as a result, a very large camera is needed for high resolution pinhole images. For example (using the formula A=SQRT(55F)), the optimal pinhole size of a 1" focal length (i.e. 1" thick) pinhole camera is about 0.007". For a "normal" viewing angle of about 53°, this results in about a 134.8 pixel diagonal dimension, or about a 95×95 pixel resolution image. The optimal pinhole size of a 10" focal length (i.e. 10" thick) pinhole camera is about 0.023". With a 53° viewing angle, this results in about a 426.4 diagonal resolution, or about a 301×301 resolution image. (Note that different photographers will use different subjective criteria in assessing the resolvable resolution of a pinhole camera. The resolution calculated here is based on one interpretation of resolvable resolution. Other interpretations may lead higher or lower resolution assessments, but will normally be within a 2× range higher or lower than the numbers presented here.)

Like pinhole cameras, visible light CAI cameras are also subject to diffraction effects which may result in resolution/size trade-offs. The diffraction patterns are more complex than pinhole diffraction patterns because of the complexity of the aperture patterns, and consequently, determining the impact on image resolution and/or camera size requirements is more complex. But because the pixel resolution of the CAI image can be no higher than the order of the aperture array, to achieve a high-resolution image it is necessary to utilize high order aperture arrays which can potentially exhibit worse diffraction effects than lower order aperture arrays or, alternatively, require longer focal lengths (and, as a result, larger camera sizes) to mitigate those diffraction effects.

Another approach to improving the performance of a lens system in a digital camera is a plenoptic camera. The basic concept of a plenoptic camera is described in U.S. Pat. No. 5,076,687. Although the word "plenoptic" is not used in the patent, the device referenced in the patent is called a "plenoptic camera" by its inventor in a paper describing an application of the camera, "Single Lens Stereo with a Plenoptic Camera", by Edward H. Adelson and John Y. A. Wang, IEEE Transactions on Pattern Analysis and Machine Intelligence, Vol 14, No. 2, February 1992, currently found at: http://persci.mit.edu/pub_pdfs/plenoptic.pdf. In 2005, Stanford University researchers published a paper (Stanford Tech Report CTSR 2005-02) describing an application of a plenoptic camera implementation that achieves the DOF of a conventional f/22 lens while capturing the equivalent light from the scene that would be gathered by an f/4 lens. Unfortunately, this increase in light gathering ability comes at a theoretically linear cost of image resolution. The prototype constructed by the team resulted in about 2× beyond the theoretical resolution losses, so with a 4000×4000 pixel sensor they were able to reconstruct only a 296×296 image which exhibited the f/22 DOF with f/4 light capture (i.e. a 16 megapixel sensor yielded a 90 kilopixel image). While such a system might be useful for certain specialized applications, the enormous losses of sensor resolution would likely make such a system non-competitive for general photographic applications. Also, the bulkiness of the conventional lens system that is placed in front of the microlens array results in a very long-lensed camera, which is not suitable for thin devices, such as mobile phones and tablets, which increasingly displacing thick-bodied conventional cameras. A commercial version of the plenoptic camera was released by Lytro, Inc. of Mountain View, Calif. (www.lytro.com), and the advertised dimensions of the camera available at this time is 1.61 inch×1.61 inch×4.41 inch, with the longest dimension of 4.41 inches due to the length of the lens. A typically available mobile phone camera's lens has a length that is only a few millimeters.

SUMMARY

An apparatus and method are described for capturing images in visible light as well as other radiation wavelengths. In one embodiment, the apparatus comprises: a diffraction coded imaging system including a plurality of apertures arranged in a diffraction coded array pattern with opaque material blocking array elements not containing apertures; and a light- or radiation-sensitive sensor coupled to the diffraction coded imaging system array and positioned at a specified distance behind the diffraction coded imaging system array, the radiation-sensitive sensor configured to sense light or radiation transmitted and diffracted through the apertures in the diffraction coded imaging system array.

BRIEF DESCRIPTION OF THE DRAWINGS

A better understanding of the present invention can be obtained from the following detailed description in conjunction with the drawings, in which.

DETAILED DESCRIPTION

A system and method for capturing still images and video using coded lens imaging techniques is described below. In the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Coded Aperture Imaging (CAI) Camera System Architecture

Figure 1:
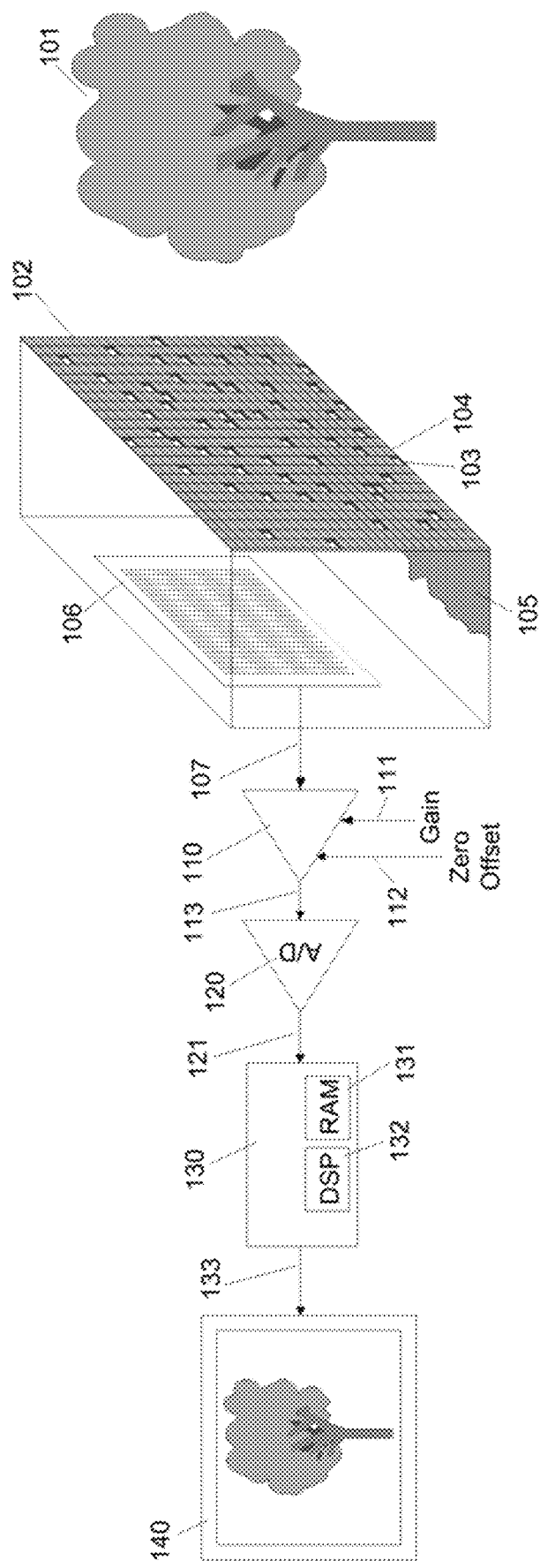
FIG. 1 illustrates a coded aperture camera according to one embodiment of the invention.

A visible light coded aperture camera according to one embodiment of the invention is illustrated in FIG. 1. The illustrated embodiment includes a coded aperture 102 placed in front of a light sensitive grayscale or color semiconductor sensor 106. The coded aperture 102 is a pattern of circular, square or rectangular elements, some of which are transparent to visible light (e.g. element 103) and some of which are opaque (e.g. element 104). Note that for illustration clarity purposes, coded aperture 102 has very few transparent elements. A typical coded aperture may have significantly more transparent elements (e.g., 50%). Visible light a from 2-dimensional or 3-dimensional scene 101 (which may be illuminated by ambient or artificial lighting) is projected through the coded aperture 102 onto image sensor 106. The camera is capable of limiting the field-of-view to the fully coded field-of-view projected onto the sensor. In one embodiment, this is implemented by the use of a self-collimating coded aperture 102 (self-collimation is explained below). The space between the coded aperture and the sensor is shielded by a light-opaque housing 105 (only the outline of which is shown in FIG. 1), preventing any light from reaching the sensor other than by passing through an open element of the coded aperture.

The camera further includes an image sensor readout subsystem 110 with an interface 107 to the image sensor 105 (which may be similar to those used in prior coded aperture systems). The readout subsystem clocks out the analog image signal from the image sensor 106 and applies analog buffering, amplification and/or filtering as required by the particular image sensor. An example of such a readout subsystem 110 that also incorporates A/D 120 is the NDX-1260 CleanCapture Image Processor by NuCore Technology, Inc. of Sunnyvale, Calif. The ability to adjust the zero offset 112 and gain 111 to analog pixel values read by the readout subsystem 110 (e.g., using at least one operational amplifier (op amp)) will increase the dynamic range of the captured image, but is not essential if the image sensor has a sufficient dynamic range for the desired image quality without a zero-offset and gain adjustment.

In one embodiment, the output of the readout subsystem 110 is coupled by interface 113 to at least one analog-to-digital converter (A/D) 120 which digitizes the analog output. The output of the A/D is coupled via interface 121 to an image reconstruction processor 130, which in one embodiment incorporates a Digital Signal Processor (DSP) 132 and Random Access Memory (RAM) 131. The digitized image from the interface 121 is stored in RAM 131, and the DSP 132 post-processes the image so as to reconstruct the original scene 101 into a grayscale or color image. In accordance with another embodiment, the image reconstruction processor 130 incorporates a general purpose CPU such as an Intel Corporation Pentium 4®, or similar general purpose processor. In yet another embodiment, the image reconstruction processor 130 incorporates an Application-Specific Integrated Circuit ("ASIC") which implements part or all of the reconstruction processing in dedicated digital structures. This grayscale or color image reconstructed by reconstruction processor 130 is output through interface 133 to be displayed on a display device 140.

Note that the camera illustrated in FIG. 1 does not require a lens of any sort. Also, no special imaging conditions are required (e.g., no controlled positioning of the camera or objects in the scene nor controlled lighting is required). Further, the camera is capable of imaging 3-dimensional real-world scenes (i.e., scenes containing objects with unknown and varying ranges). In short, the camera illustrated in FIG. 1 can be used in the same way as a conventional lens camera.

Figure 2:
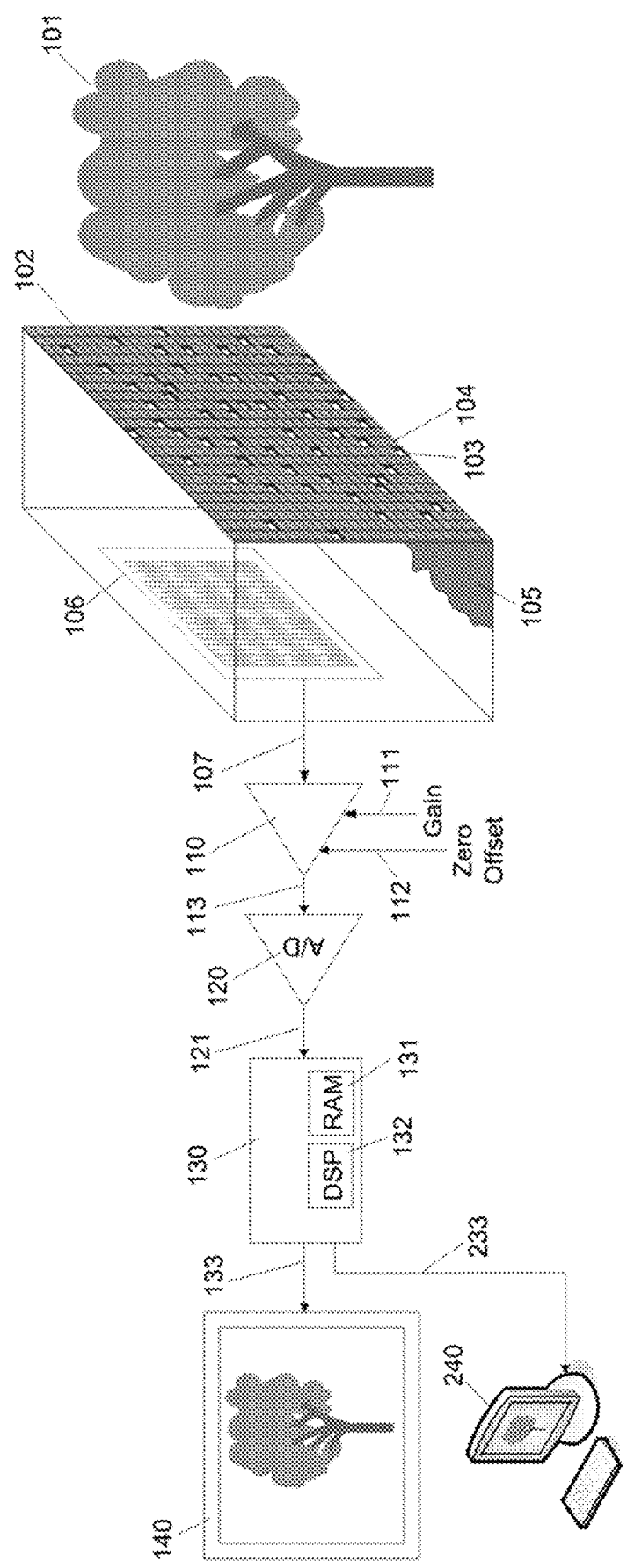
FIG. 2 illustrates a coded aperture camera according to one embodiment of the invention.

According to one embodiment illustrated in FIG. 2, the resulting output 133 from the reconstruction processor is a 2-dimensional array of grayscale or color pixels representing the scene within the field of view of the camera. In one embodiment, the pixel data is transmitted through digital interface 233 to a computer 240 (or other image processing device). Thus, the output of the coded aperture camera will appear to any attached device as if it is the output of a conventional digital camera. Digital interface 233 for transferring the reconstructed image data may be any digital interface capable of handling the bandwidth from the camera for its required application such as for example, a Thunderbolt interface or a USB 3.0 interface (which would be suitable for still and video camera applications). Of course, the underlying principles of the invention are not limited to any particular interface 233. Preferably, the camera includes a display 140 (e.g., an LCD or OLED display), for presenting the reconstructed images to the photographer, but in this embodiment, display device 140 and interface 133 are optional.

Figure 3:
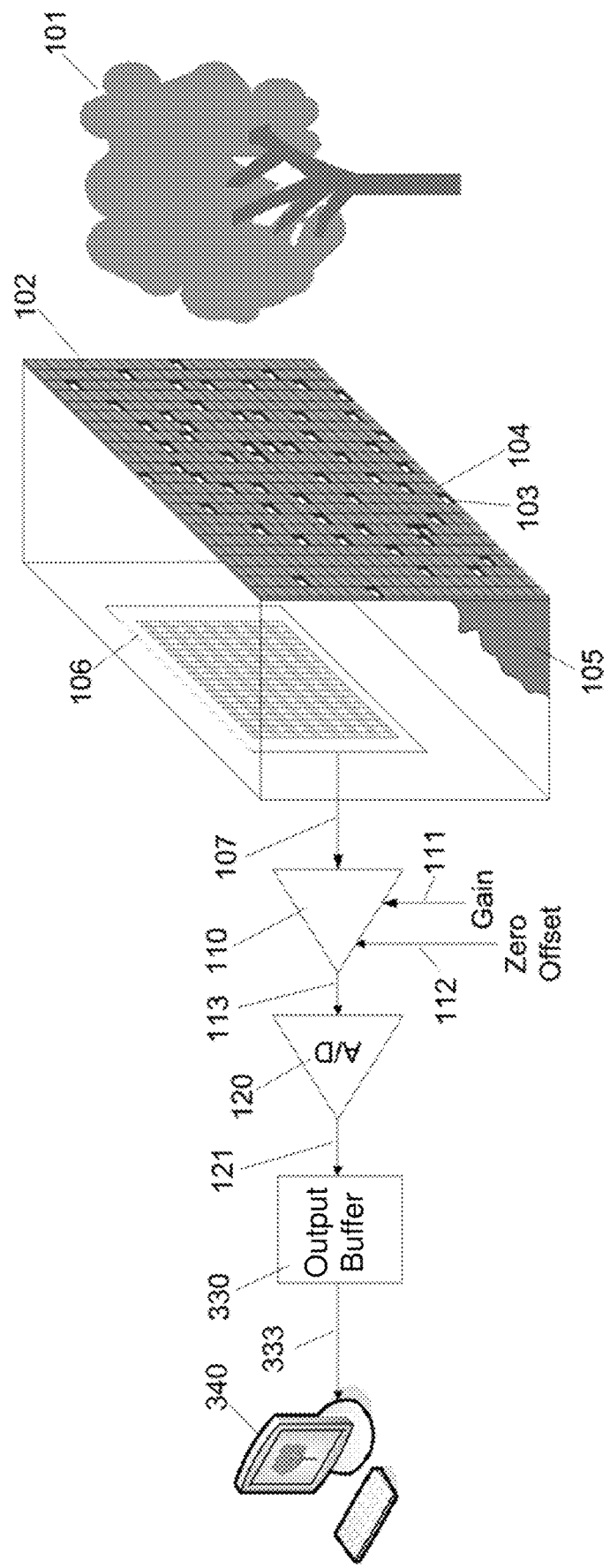
FIG. 3 illustrates a coded aperture camera according to one embodiment of the invention.

According to one embodiment illustrated in FIG. 3, the camera does not include reconstruction processor 130. Instead, the digitized image data from the A/D converter 120 is coupled through interface 121 to output buffer 330 where the image data is packetized and formatted to be output through digital interface 333. Digital interface 333 would typically be coupled to an external computing means such as a personal computer 340, either to be processed and reconstructed immediately, or stored on a mass storage medium (e.g., magnetic or optical disc, semiconductor memory, etc.) for processing and reconstruction at a later time. Preferably, the external computing device 340 has a display for presenting the reconstructed images to the photographer. Alternatively, or in addition, interface 333 is coupled directly to a mass storage medium (e.g., magnetic or optical disc, semiconductor memory, etc.). Digital interface 333 for transferring the reconstructed image data could be any digital interface capable of handling the bandwidth from the camera for its required application (e.g., IEEE1394 ("FireWire") interface or a USB 2.0 interface).

Aperture Pattern Construction

Figure 4:
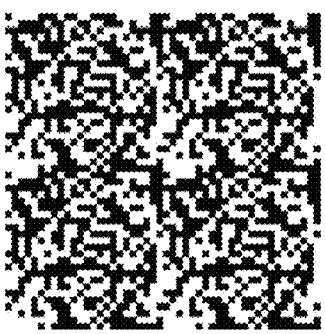
FIG. 4 illustrates MURA and PBA patterns in accordance with one embodiment of the invention.
Figure 4:
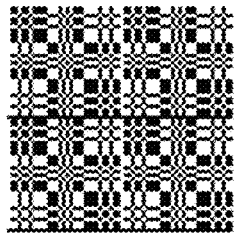
Figure 4:
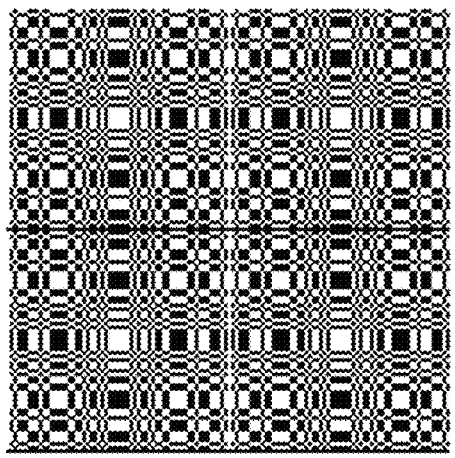
Figure 4:
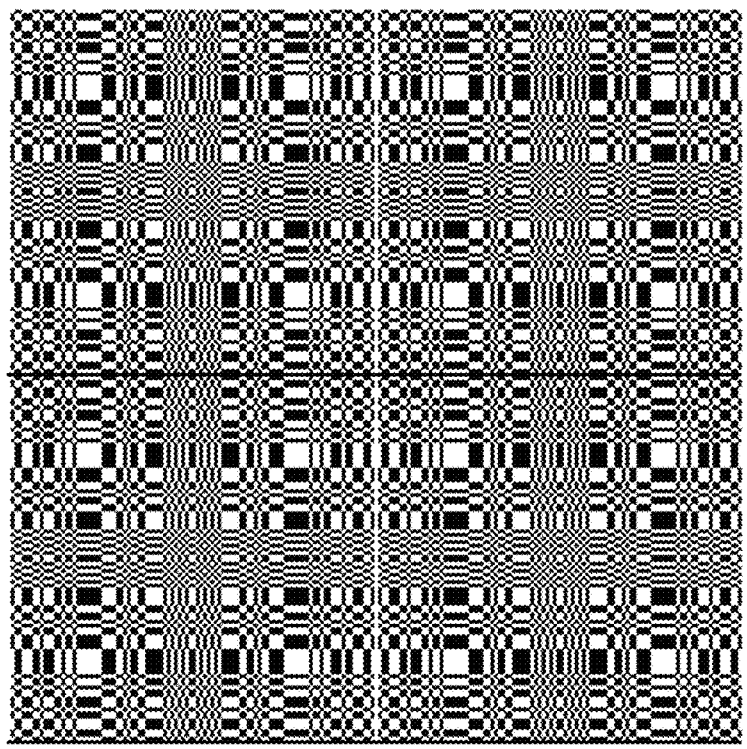

According to one embodiment of the invention, the aperture pattern 102 is a Modified Uniformly Redundant Array ("MURA") pattern. The basic aperture pattern may be the same size as the sensor, and the overall aperture may be a 2×2 mosaic of this basic aperture pattern. Each transparent or opaque element of the aperture has at least the size of a pixel of the sensor. Three exemplary MURA patterns and two PBA patterns are illustrated in FIG. 4. MURA 101 is a 101×101 element pattern, MURA 61 is a 61×61 element pattern, and MURA 31 is a 31×31 element pattern. PBA 8 is an 8×8 element pattern and PBA 24 is a 24×24 element pattern. Each black area is opaque and each white area is transparent (open).

Aperture Fabrication

In one embodiment, the coded aperture consists of a glass wafer carrying a thin chromium layer. Upon manufacturing, the chromium layer carries a film of varnish which is sensitive to electron beams. The structure of the aperture is created by electron lithography. Specifically, the varnish is removed at the locations of the transparent aperture elements. Next, the chromium layer is cauterized in those locations not covered by varnish. The remaining varnish is then removed.

Aperture Pixel Size

In one embodiment, in order to allow an accurate reconstruction of the scene, an individual pixel of the sensor is no larger than an individual aperture element, magnified by the geometric scaling factor $f=(o+a)/o$, where o is the distance between the scene and the aperture and a is the distance between the aperture and the sensor. This factor is 1 if the object is at infinity and less than one if the object is at a finite distance. Therefore, if the sensor pixel size is chosen to be the same size as or smaller than an individual aperture element, objects at all distances can be reconstructed accurately.

If the size of an individual aperture element is in the order of magnitude of the wavelength of the light being imaged, the aperture may cause undesired wave-optical interference in addition to the desired effect of selectively blocking and transmitting the light. The wavelength of visible light is in the range between 380 nm and 780 nm. Preferably, the aperture dimensions are at least ten times as large as the longest wavelength to be imaged. Therefore, in one embodiment, the width or height of an individual aperture element is at least 7.8 microns to avoid wave-optical interference or diffraction effects. Note that while larger aperture elements will mitigate some wave-optical interference or diffraction effects there will be always be some wave-optical interference and diffraction effects to a greater or lesser degree.

Diffraction Coded Imaging (DCI) Camera System Architecture

Although wave-optical interference and diffraction effects can be mitigated by utilizing larger apertures, as described in the previous paragraph, in one embodiment of a visible light coded lens array camera, the wave-optical interference or diffraction effects are deliberately utilized, not just to allow for smaller apertures, but also—as examples but not limitations—to accommodate any other properties of the captured wavelengths, the camera, or aperture array that result in wave optical or diffractive effects such as, but not limited to, the shape of aperture, the distance to the sensor, the physical structure of the camera, the size of the camera, changing the image processing required, manufacturing imprecision, or achieving in aperture patterns that are more efficient in their light transmission. A camera so constructed to utilize (and/or accommodate) wave-optical interference and/or diffraction effects is referred herein as a Diffraction Coded Imaging (DCI) camera system (or "DCI camera").

Figure 5:
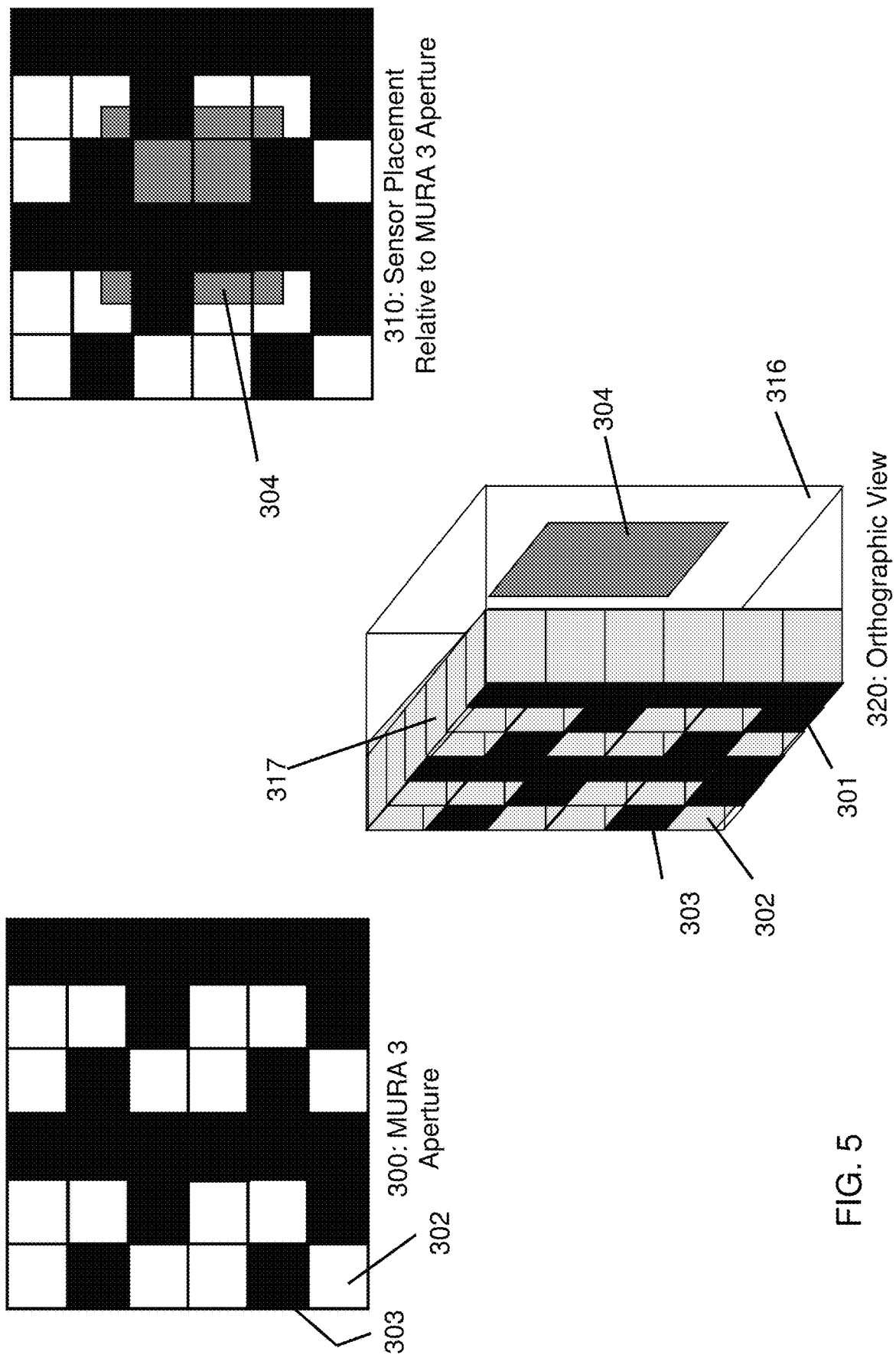
FIG. 5 illustrates the configuration of a MURA order 3 coded aperture array, baffles, sensor, and a camera body in accordance with one embodiment of the invention.

A Coded Aperture Imaging (CAI) camera system ("CAI camera") is described above and in the CAI Applications, and as shown in FIG. 1 light from a scene projects through a coded aperture array 102 onto a sensor 106. As shown in FIG. 5, baffles 317 are used to collimate the light from each aperture to result in the overlapping projections from the apertures shown in 420 of FIG. 6. Further details of implementing a practical CAI system are described above and in the CAI Application as well as in other Patents, Applications and a Provisional Application incorporated by reference in [0001]. Further, a Coded Lens System (CLI), similar to CAI, but using lenses rather than apertures, is described in U.S. patent application Ser. No. 11/210,098 entitled "Apparatus And Method For Capturing Still Images And Video Using Coded Lens Imaging Techniques" filed on Aug. 22, 2005, now U.S. Pat. No. 7,671,321 as well as in other Patents, Applications and a Provisional Application incorporated by referenced in [0001].

In one embodiment, a DCI camera system is configured and operates in a manner very similar to the CAI camera system shown in FIG. 1, with the very significant difference being that, rather than assuming that the radiation passing through the physical aperture pattern 102 is largely unaffected by wave-optical interference and/or diffraction effects, the physical aperture pattern 102 is deliberately chosen to exploit wave-optical interference and/or diffraction effects so that the projected light on the sensor 106 is in a desired overlapping pattern (e.g. such as that shown for a MURA 3 in FIG. 6) that would have resulted if the physical aperture pattern 102 had a desired aperture pattern (e.g. the MURA 3 physical aperture pattern in illustration 300 of FIG. 5) and there had been no wave-optical interference and/or diffraction effects. By way of illustration, if the chosen wavelength is so short (e.g. x-ray or gamma ray radiation) relative to the size of the apertures in physical aperture pattern 102 that there are insignificant wave-optical interference and/or diffraction effects as the radiation passes through the apertures 302, the baffles 317 and reaches the sensor 304 of FIG. 5, then in this degenerate case, the physical aperture pattern 102 would be the same as the aperture pattern for digitally reconstructing the image e.g. the MURA 3 aperture pattern in illustration 300 of FIG. 5), as has been the case in systems described in the Patents, Patent Applications and the Provisional Application incorporated herein by reference in [0001], But, if the radiation wavelength is such that there are significant wave-optical interference and/or diffraction effects as the radiation passes through the apertures 302, the baffles 317 and reaches the sensor 304 of FIG. 5, then the physical aperture pattern 300 of FIG. 5 (a MURA 3 in this example) would be not be the physical aperture pattern used, as shown in this FIG. 5. Instead, a physical aperture pattern would be chosen such that when the radiation (e.g. light, microwaves) from the scene passes through the physical aperture pattern openings 302, any baffles 317, and reaches the sensor 304, the wave-optical and/or diffraction effects result in an overlapping image on the sensor 304 such as that shown in 420 in FIG. 6, as if the desired aperture pattern for reconstruction had been used in the physical aperture 300 of FIG. 5 and there had been no wave-optical interference and/or diffraction effects. Then, the image is reconstructed from this overlapping pattern, such as that shown in 420 of FIG. 6, using the CAI techniques described in the Patents, Patent Applications and the Provisional Application incorporated herein by reference in [0001].

Figure 6:
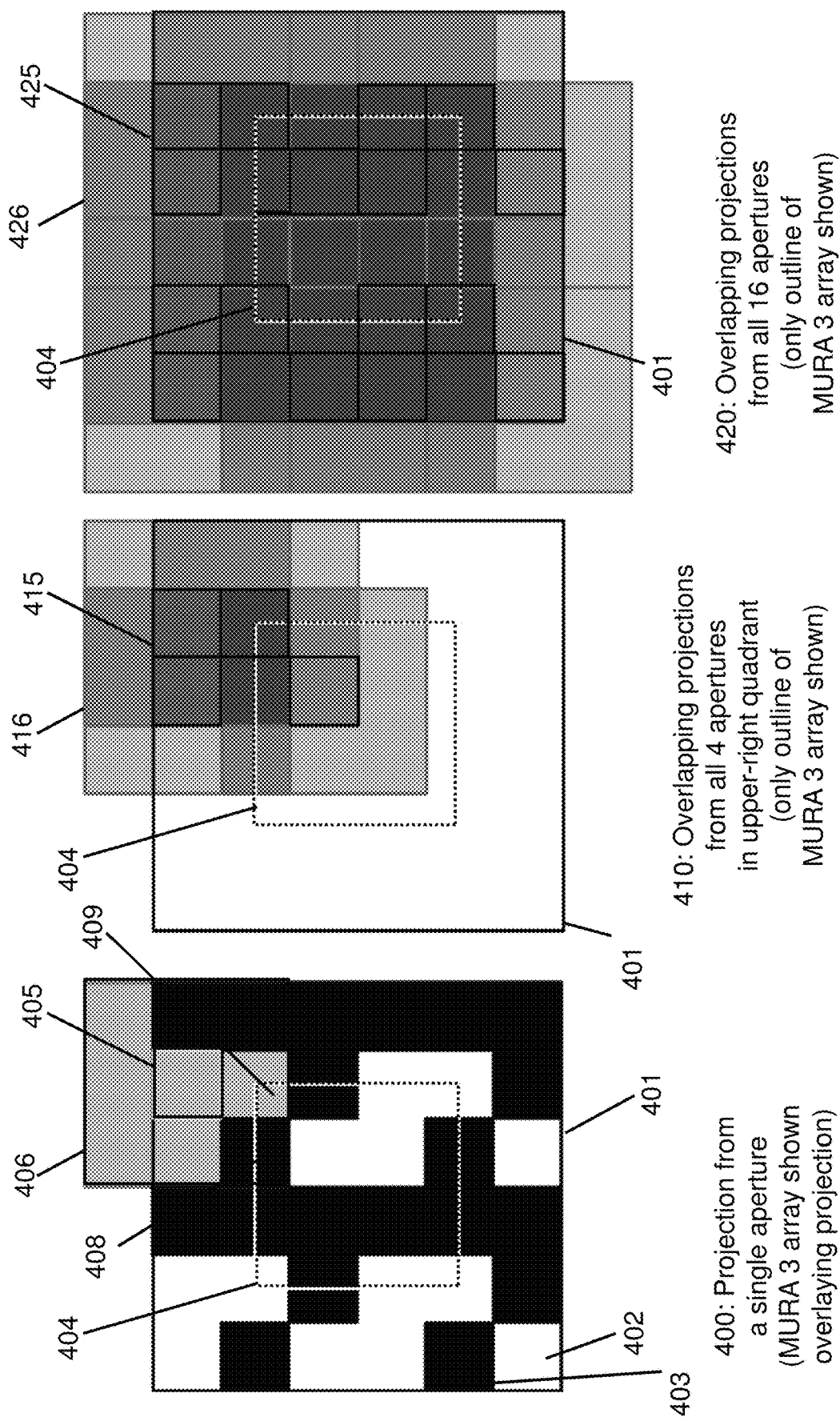
FIG. 6 illustrates the projection of radiation from transparent apertures in a MURA 3 coded aperture array in accordance with one embodiment of the invention.
Figure 7:
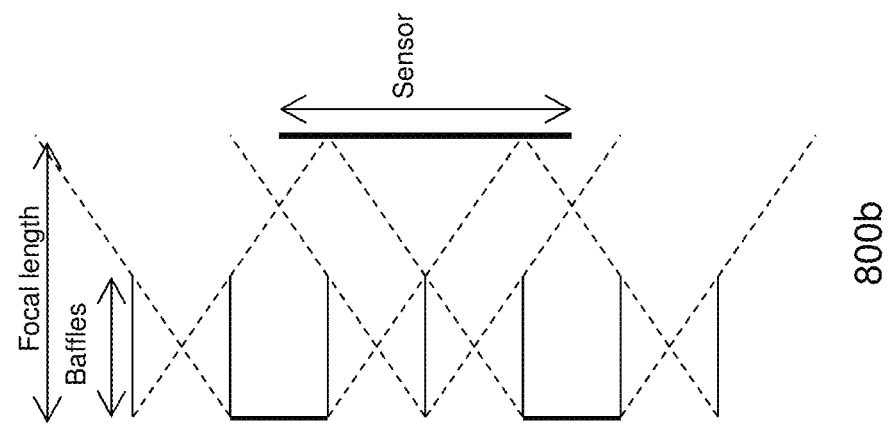
FIG. 7 illustrates a side view of a MURA order 3 coded imaging camera in accordance with one embodiment of the invention.
Figure 7:
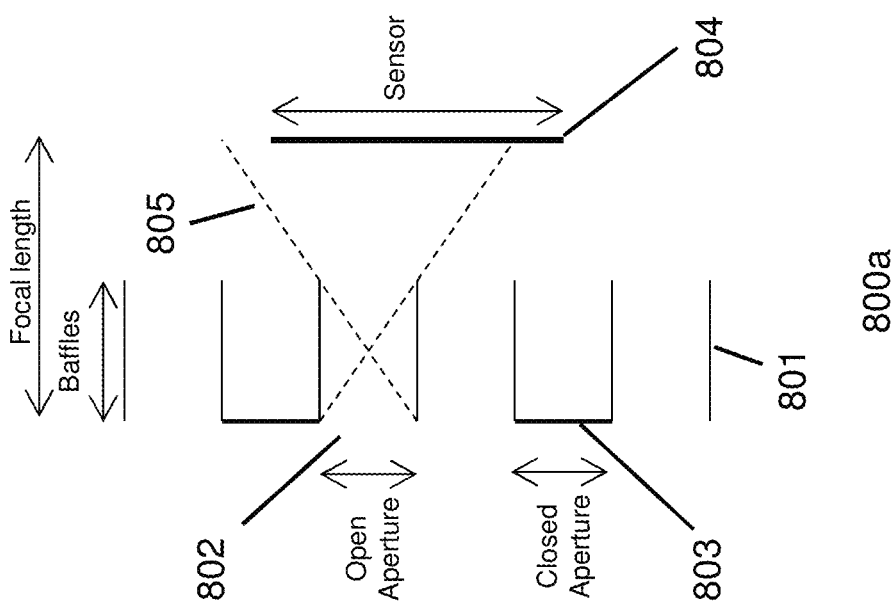

Thus, in the DCI camera preferred embodiment described in the preceding paragraph, the DCI camera is configured as the CAI camera shown in FIGS. 1-3, FIG. 5 and FIG. 7, and the resulting projected overlapping image on the sensor is as it is shown in FIG. 6, and the image is reconstructed using array patterns such as those shown in FIG. 4. But, the physical aperture patterns 102 of FIGS. 1-3 and 300 of FIG. 5 and the leftmost column of 800b in FIG. 7 would not be the same as the physical aperture pattern used for digital reconstruction of the image. Rather, a physical aperture pattern would be chosen that, as a result of wave-optical interference and/or diffraction effects, the resulting projected overlapping image on the sensor is as it is shown in FIG. 6. Effectively, in the preferred embodiment a physical aperture pattern is chosen that precompensates for the effects of wave-optical interference and/or diffraction such that the overlapping projected pattern on the sensor is the desired pattern to be used for digitally reconstructing the image. Thus, depending on the extent of the wave-optical interference and/or diffraction, the physical aperture pattern used may have little or no resemblance to the desired pattern to be used for digitally reconstructing the image. For example, to achieve the MURA 3 overlapping projections illustrated in FIG. 6 420, the physical aperture pattern used for aperture 102 of FIGS. 1 and 2, 300 of FIG. 5, and the leftmost aperture column pattern shown in 800a and 800b of FIG. 7 may have no resemblance whatsoever to a MURA 3.

As is known to practitioners of skill in the art, light that is passing through a small aperture or along edges, such as those of baffles, will demonstrate diffraction effects, as observed by the projection on the sensor. Further, light that is passing through multiple apertures whose projections overlap at a surface (e.g. the surface of sensor 804 in FIG. 7) will show interference effects upon the surface due to the interference (e.g. constructive and destructive combination) of the light waves. These effects are well-understood and can be precisely modeled mathematically for a given geometry of apertures, baffles, focal length, etc. For example, the Wikipedia article section on diffraction of light, http://en.wikipedia.org/wiki/Diffraction#Diffraction_of_light provides formulae and illustrations of diffraction and wave-optical interference. Diffraction and wave-optical interference shall be referred to herein as "diffraction and interference effects of light", and diffraction and wave interference of radiation generally shall be referred to herein as "diffraction and interference effects".

Figure 8:
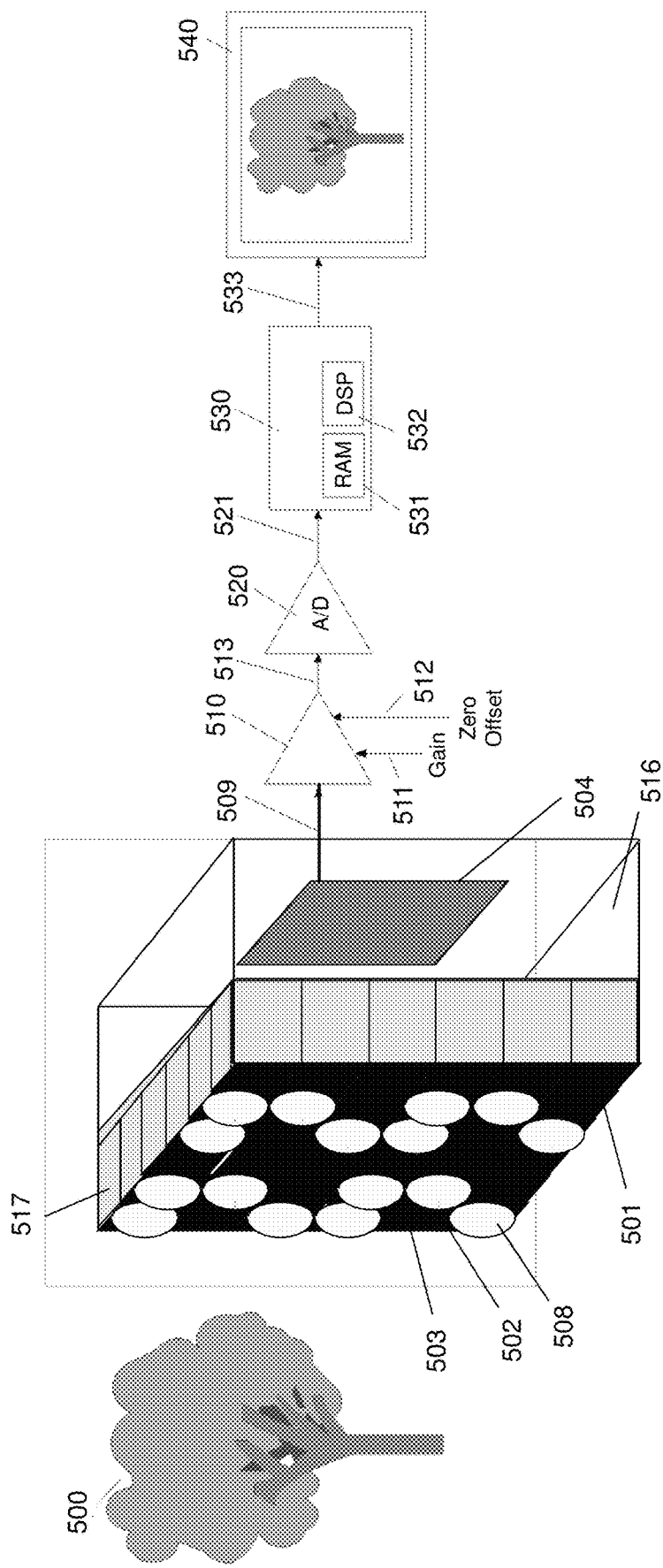
FIG. 8 illustrates a coded lens camera according to one embodiment of the invention.
Figure 9:
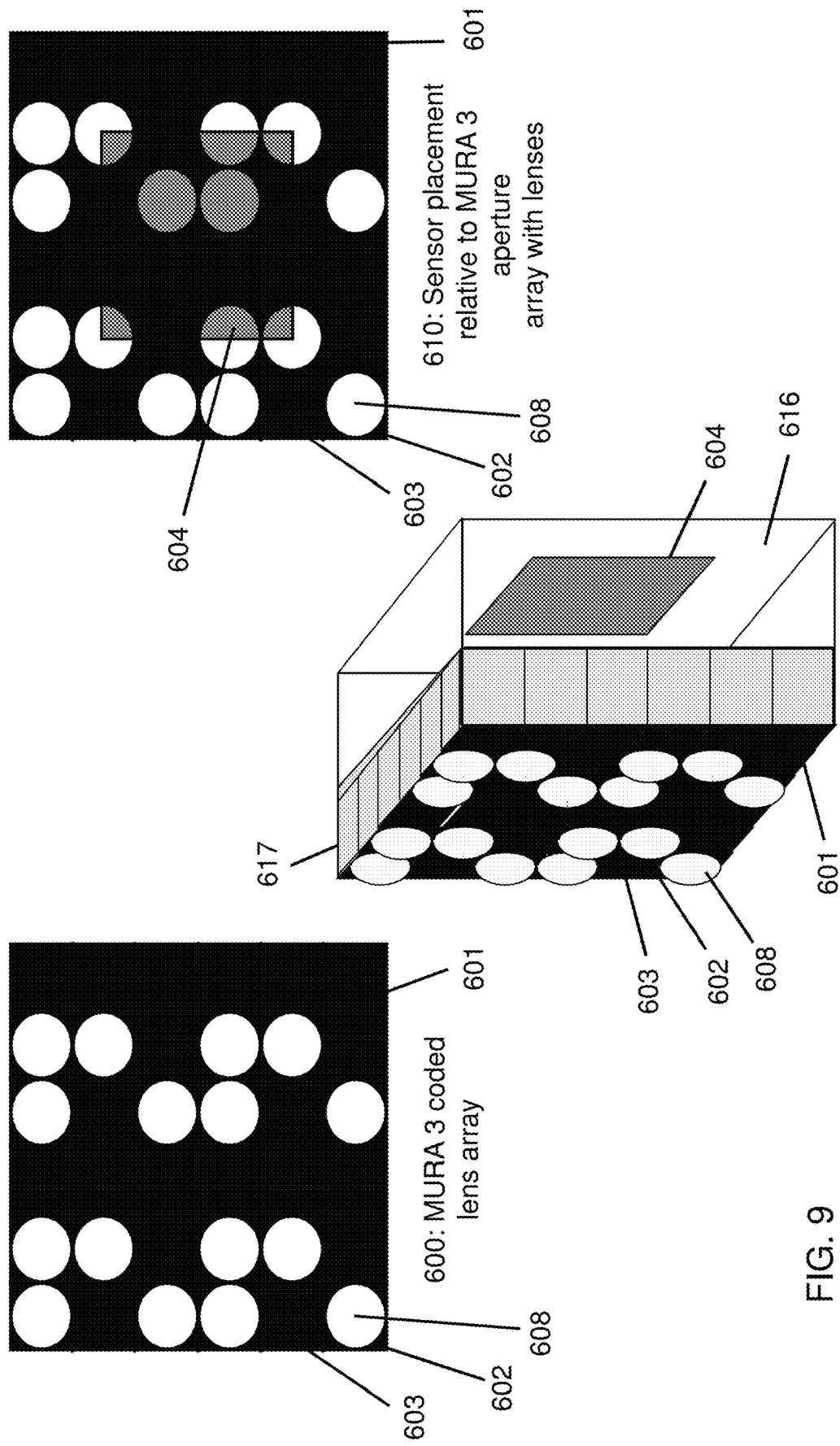
FIG. 9 illustrates the configuration of a MURA order 3 coded lens array, baffles, sensor, and a camera body in accordance with one embodiment of the invention.
Figure 10:
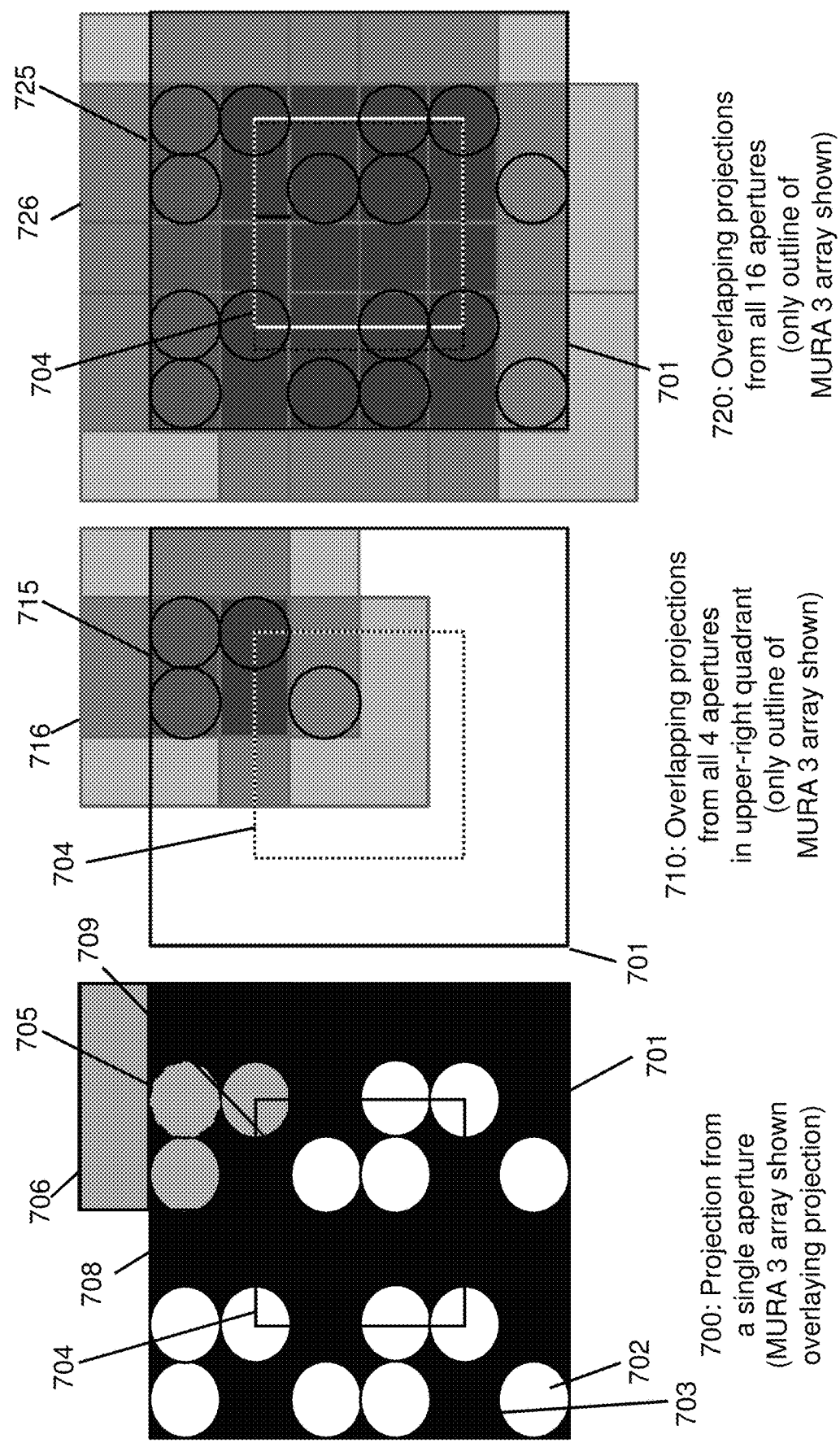
FIG. 10 illustrates the projection of radiation from lenses in a MURA 3 coded lens array in accordance with one embodiment of the invention.
Figure 11:
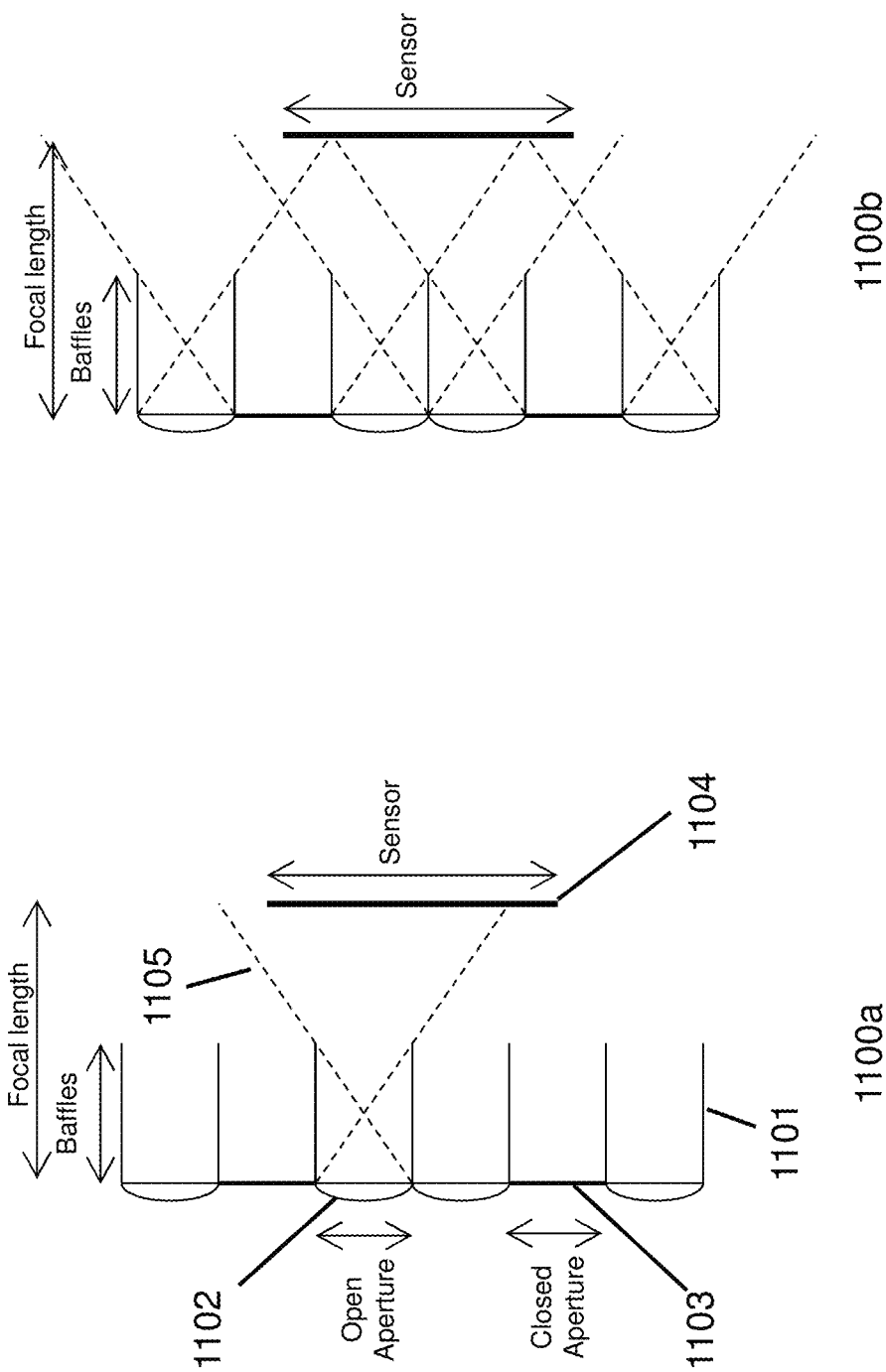
FIG. 11 illustrates a side view of a MURA order 3 coded lens camera in accordance with one embodiment of the invention

Just as diffraction and interference effects of light through apertures are well-known and well-characterized mathematically by practitioners of skill in the art, so are diffraction and interference effects of light projected through lenses. FIG. 8 illustrates a Coded Lenses Imaging (CLI) system that, like a CAI system, projects light from a scene through a pattern of overlapping projections onto a sensor 504. The notable difference between CAI system and a CLI system is the CAI system projects light through apertures, whereas the CLI system projects light through lenses. This is illustrated in FIGS. 8, 9, 10 and 11, and CLI is described in Patents, Patent Applications and a Provisional Application incorporated by referenced in [0001]. As with apertures in CAI systems, light passing through small lenses or along edges, such as those of baffles, will demonstrate diffraction effects, as observed by the projection on the sensor. Further, light that is passing through multiple lenses whose projections overlap at a surface (e.g. the surface of sensor 1104 in FIG. 11) will show interference effects upon the surface due to the interference (e.g. constructive and destructive combination of the light waves. These effects are well-understood and can be accurately modeled mathematically for a given geometry, structure and refractive characteristics of the lenses, geometry of apertures behind or in front of the lenses, baffles, focal length, etc.

Further just as diffraction and interference effects of light through apertures and lenses are well-known and well-characterized mathematically by practitioners of skill in the art, so are diffraction and interference effects of radiation at non-light wavelengths projected through apertures. While FIGS. 1-3, FIG. 5 and FIG. 7 and the resulting projected overlapping image on the sensor is as it is shown in FIG. 6 illustrate a visible light camera, if the radiation were at a non-visible light wavelength (e.g. nearby wavelengths to visible light such as infrared or ultraviolet, or very distant wavelengths from visible light such as microwaves) and the sensor was responsive to such radiation wavelength and the blocked apertures and baffles were of appropriate materials to block such wavelengths, then the same figures would also illustrate Coded Aperture Imaging cameras for capturing images in non-visible light. While conventional lens-based cameras are commercially available for infrared and ultraviolet imaging, cameras for capturing in other wavelengths are typically not available at all, yet there are a wide range of applications where such cameras could be used. For example, microwaves can pass harmlessly through walls and living tissue and other obstacles (e.g., unlike x-rays which can pass through obstacles, but can be harmful to living tissue). But, microwave wavelengths are so long compared to those of visible light that conventional light imaging techniques (e.g. a small glass lens camera) cannot be used. A CAI camera would require extremely large apertures (impractical for most imaging applications) to be able to image at microwave wavelengths without incurring significant diffraction and interference effects. Smaller apertures could be used (e.g. to create a camera that is of a practical size), but there would be substantial diffraction and interference effects. If a DCI camera is used instead of a CAI camera, then the aperture pattern is chosen so as to precompensate for diffraction and interference effects. Thus, a DCI camera can utilize smaller apertures and still resulting in a desired overlapping pattern of projections on the sensor, and then the image, in the non-visible light wavelength, can be digitally reconstructed, utilizing the CAI techniques described in Patents, Patent Applications and the Provisional Application incorporated by referenced in [0001].

For some radiation wavelengths, lenses may not be a practical option for a camera, because the radiation may penetrate lens material without significant refraction, or the lenses may have to be impractically large. In a DCI camera, a physical aperture pattern can be used that, through diffraction and interference, results in an overlapping pattern on the sensor that would have resulted if physical lenses had been practical. In this way, CLI imaging and digital image reconstruction techniques can be used to reconstruct the image, even in wavelengths are used where lenses would not be feasible for a practical camera.

In all of the CAI and CLI system Figures and descriptions, baffles (or apertures equivalently thick as baffles) are used to collimate the light so that there is a bounded limit to each projected pattern. In the case of a DCI system, baffles can still be used, but also baffles can be eliminated if the diffraction and interference effects are such that the desired overlapping projected pattern on the sensor is achieved without baffles. Thus, with DCI it is possible to create a camera that is even simpler than a CAI or CLI camera because no baffles are necessary, just the physical apertures and/or physical lenses.

Depending on the radiation wavelength and the geometry of a DCI camera (e.g. focal length, size of apertures), there may not be a physical aperture pattern that exists that precompensates the diffraction and interference effects for a particular desired pattern for digital reconstruction of the image. If not, then there may be an alternative pattern for digital reconstruction that can be precompensated for by a physical pattern that does exist. If so, then that physical aperture pattern can be used, and the digital reconstruction will use the projected pattern that results. As noted in the Patents, Patent Applications and the Provisional Application incorporated by referenced in [0001], some digital reconstruction patterns produce better results than others. If physical aperture patterns can be found for more than one digital reconstruction pattern, then in one embodiment the physical aperture pattern that produces the best image reconstruction results is used.

Although the radiation detection sensor 102 in FIG. 1 for visible, infrared and ultraviolet light is typically a CCD or CMOS array, sensors at non-light wavelengths may be in a different form. For example, a sensor of microwave radiation may be in the form of an array of microwave-sensitive antennas, rather than an array of light-sensitive CCD or CMOS pixels.

Embodiments of the invention may include various steps as set forth above. The steps may be embodied in machine-executable instructions which cause a general-purpose or special-purpose processor to perform certain steps. For example, the various operations described above may be software executed by a personal computer or embedded on a PCI card within a personal computer. Alternatively, or in addition, the operations may be implemented by a DSP or ASIC. Moreover, various components which are not relevant to the underlying principles of the invention such as computer memory, hard drive, input devices, etc, have been left out of the figures and description to avoid obscuring the pertinent aspects of the invention.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. For example, while the embodiments of the invention are described above in the context of a "camera," the underlying principles of the invention may be implemented within virtually any type of device including, but not limited to, PDA's, cellular telephones, and notebook computers. Accordingly, the scope and spirit of the present invention should be judged in terms of the claims which follow.

What is claimed is:

1. An apparatus for precompensating for the effects of diffraction and wave-optical interference comprising:
   a sensor;
   a physical aperture pattern constructed to emulate a result of a desired aperture pattern if the desired aperture pattern did not produce wave-optical interference and diffraction effects,
   the physical aperture pattern to receive radiation from a scene and pre-compensate for the wave-optical interference and diffraction effects of the desired aperture pattern, taking advantage of wave-optical interference and diffraction effects of the physical aperture pattern to project a radiation pattern, the radiation pattern projected in a desired overlapping pattern that would have resulted if the physical aperture pattern had the desired aperture pattern but without the wave-optical interference and diffraction effects.

2. The apparatus as in claim 1 wherein the physical aperture pattern is used for more than one frame.

3. The apparatus as in claim 2 wherein the subject is at varying distances from the physical aperture pattern.

4. The apparatus as in claim 1 wherein the radiation includes visible light wavelengths.

5. The apparatus as in claim 1 wherein the radiation includes infrared wavelengths.

6. The apparatus as in claim 1 wherein the radiation includes ultraviolet wavelengths.

7. The apparatus as in claim 1 wherein the radiation includes microwave wavelengths.

8. The apparatus as in claim 1 wherein the radiation pattern is projected upon a sensor sensitive to the wavelength of the radiation.

9. The apparatus as in claim 8 wherein the projected radiation pattern comprises a plurality of overlapping images.

10. The apparatus as in claim 9 wherein the plurality of overlapping images is processed using coded aperture imaging techniques.

11. The apparatus as in claim 9 the pattern incident upon the sensor is an overlapping of the image of a subject positioned in front of the physical aperture pattern as projected through a plurality of Uniformly Redundant Array (URA) patterns if there had been no wave-optical interference and/or diffraction effects.

12. The apparatus as in claim 9 wherein the pattern incident upon the sensor is an overlapping of the image of a subject positioned in front of the physical aperture pattern as projected through a plurality of Modified Uniformly Redundant Array (MURA) patterns if there had been no wave-optical interference and/or diffraction effects.

13. The apparatus as in claim 9 wherein the pattern incident upon the sensor is an overlapping of the image of a subject positioned in front of the physical aperture pattern as projected through a plurality of Perfect Binary Array (PBA) patterns if there had been no wave-optical interference and/or diffraction effects.

14. The apparatus as in claim 9 wherein the pattern incident upon the sensor is an overlapping of the image of a subject positioned in front of the physical aperture pattern as projected through a plurality of random patterns if there had been no wave-optical interference and/or diffraction effects.

15. A machine-implemented method comprising:
   precompensating for the effects of diffraction and wave-optical interference on an apparatus comprising:
   a sensor;
   a physical aperture pattern constructed to emulate a result of a desired aperture pattern if the desired aperture pattern did not produce wave-optical interference and diffraction effects,
   the physical aperture pattern receiving radiation from a scene and pre-compensating for the wave-optical interference and diffraction effects of the desired aperture pattern, taking advantage of wave-optical interference and diffraction effects of the physical aperture pattern to project a radiation pattern, the radiation pattern projected in a desired overlapping pattern that would have resulted if the physical aperture pattern had the desired aperture pattern but without the wave-optical interference and diffraction effects.

16. The machine-implemented method as in claim 15 wherein the physical aperture pattern is used for more than one frame.

17. The machine-implemented method as in claim 16 wherein the subject is at varying distances from the physical aperture pattern.

18. The machine-implemented method as in claim 15 wherein the radiation includes visible light wavelengths.

19. The machine-implemented method as in claim 15 wherein the radiation includes infrared wavelengths.

20. The machine-implemented method as in claim 15 wherein the radiation includes ultraviolet wavelengths.

21. The machine-implemented method as in claim 15 wherein the radiation includes microwave wavelengths.

22. The machine-implemented method as in claim 15 wherein the radiation pattern is upon a sensor sensitive to the wavelength of the radiation.

23. The machine-implemented method as in claim 22 wherein the projected radiation pattern comprises a plurality of overlapping images.

24. The machine-implemented method as in claim 23 wherein the plurality of overlapping images is processed using coded aperture imaging techniques.

25. The machine-implemented method as in claim 23 the pattern incident upon the sensor is an overlapping of the image of a subject positioned in front of the physical aperture pattern as projected through a plurality of Uniformly Redundant Array (URA) patterns if there had been no wave-optical interference and/or diffraction effects.

26. The machine-implemented method as in claim 23 wherein the pattern incident upon the sensor is an overlapping of the image of a subject positioned in front of the physical aperture pattern as projected through a plurality of Modified Uniformly Redundant Array (MURA) patterns if there had been no wave-optical interference and/or diffraction effects.

27. The machine-implemented method as in claim 23 wherein the pattern incident upon the sensor is an overlapping of the image of a subject positioned in front of the physical aperture pattern as projected through a plurality of Perfect Binary Array (PBA) patterns if there had been no wave-optical interference and/or diffraction effects.

28. The machine-implemented method as in claim 23 wherein the pattern incident upon the sensor is an overlapping of the image of a subject positioned in front of the physical aperture pattern as projected through a plurality of random patterns if there had been no wave-optical interference and/or diffraction effects.

* * * * *